(12) United States Patent
Droms

(10) Patent No.: US 7,529,815 B2
(45) Date of Patent: May 5, 2009

(54) METHODS AND APPARATUS SUPPORTING CONFIGURATION IN A NETWORK

(75) Inventor: Ralph E. Droms, Westford, MA (US)

(73) Assignee: Cisco Technology, Inc., San Jose, CA (US)

( * ) Notice: Subject to any disclaimer, the term of this patent is extended or adjusted under 35 U.S.C. 154(b) by 959 days.

(21) Appl. No.: 10/807,651

(22) Filed: Mar. 24, 2004

(65) Prior Publication Data

US 2005/0114341 A1     May 26, 2005

Related U.S. Application Data

(63) Continuation-in-part of application No. 10/720,643, filed on Nov. 24, 2003, now Pat. No. 7,318,101.

(51) Int. Cl.
*G06F 15/177* (2006.01)

(52) U.S. Cl. .......................................... 709/220; 707/10

(58) Field of Classification Search ........................ None
See application file for complete search history.

(56) References Cited

U.S. PATENT DOCUMENTS

| 5,922,049 | A * | 7/1999 | Radia et al. ................. 709/220 |
| 6,748,439 | B1 * | 6/2004 | Monachello et al. ........ 709/229 |
| 6,903,755 | B1 * | 6/2005 | Pugaczewski et al. ....... 715/735 |
| 2002/0059429 | A1 * | 5/2002 | Carpenter et al. ........... 709/227 |
| 2003/0058874 | A1 | 3/2003 | Sahaya et al. ............... 370/401 |
| 2003/0120818 | A1 * | 6/2003 | Ho ............................. 709/250 |
| 2003/0165121 | A1 | 9/2003 | Leung et al. ................. 370/313 |
| 2004/0113908 | A1 * | 6/2004 | Galanes et al. .............. 345/418 |

FOREIGN PATENT DOCUMENTS

WO     WO 02/19656 A1     3/2002

OTHER PUBLICATIONS

International Search Report from PCT/US2004/033729 filed Oct. 13, 2004, Total Pages: 4.

* cited by examiner

*Primary Examiner*—Ario Etienne
*Assistant Examiner*—Clayton R Williams
(74) *Attorney, Agent, or Firm*—BainwoodHuang

(57) ABSTRACT

During one mode of operation, a configuration server receives a signal to modify configuration information associated with a given host computer. To prompt reconfiguration of the given host computer, the configuration server generates a reconfiguration command to the given host computer. A network interface intercepts the reconfigure command and terminates a communication link through which the given host computer communicates to access the network. Termination of the communication link prompts the given host computer to initiate a reconfiguration routine for assignment of a new network address. Alternatively, the network interface forwards the reconfigure message to the given host computer and monitors communications from the given host computer to determine whether it executes the reconfigure command. If not, the network interface terminates a communication link prompting the given host computer to initiate a reconfiguration routine for assignment of a new network address.

26 Claims, 13 Drawing Sheets

METHODS AND APPARATUS SUPPORTING CONFIGURATION IN A NETWORK

RELATED APPLICATION

This application is a Continuation-In-Part (CIP) of earlier filed U.S. patent application Ser. No. 10/720,643 entitled "METHODS AND APPARATUS SUPPORTING CONFIGURATION IN A NETWORK," filed on Nov. 24, 2003, now U.S. Pat. No. 7,318,101, the entire teachings of which are incorporated herein by this reference.

BACKGROUND OF THE INVENTION

The Dynamic Host Configuration Protocol (DHCP) is specifically defined in Request For Comment 2131 (a.k.a., RFC 2131), RFC 2132 as well as other related RFCs. In general, DHCP enables host clients on an IP (Internet Protocol) network to request and obtain configuration information from a DHCP configuration server. Perhaps the most significant configuration option supported by the DHCP protocol is the dynamic allocation of IP addresses to clients. This option affords flexibility to network users, reduces the overall maintenance associated with manually administering an IP network, and supports reusability of network addresses. Thus, DHCP is particularly well-suited for use in connection with laptop computers that are used in several different networks, and use in large networks in which keeping track of a large number of IP addresses would otherwise be difficult.

There are two primary features of DHCP. First, DHCP defines mechanisms through which clients can be assigned an IP address for a finite lease period, allowing for reassignment of the IP address to another client later after the lease has expired. Second, DHCP provides the mechanism for a client to gather other IP configuration parameters it needs to operate in a TCP/IP (Transmission Control Protocol/Internet Protocol) network.

The three techniques supported by the DHCP protocol to assign IP addresses to clients include "automatic allocation" in which a DHCP server assigns a permanent IP address to a client, "manual allocation" in which a client's IP address is manually chosen by a network administrator and the DHCP server conveys the IP address to the client, and "dynamic allocation" in which a DHCP server assigns an IP address to the client for a limited period of time (e.g., a lease period).

In a typical session, the client sends a DHCPDISCOVER message to obtain an IP address from a server. The client optionally includes an IP address in the message that it would like to be assigned. The server responds with a DHCPOFFER message that includes the IP address to be assigned to the client and other parameters such as a netmask.

After the client receives the DHCPOFFER message from the configuration server, the client responds with a DHCPREQUEST message that includes a "server identifier" value. Inclusion of the server identifier value indicates to the configuration server that the client has accepted its offer. The message also indicates to other servers that the requesting client has declined their offers. The selected server receives the DHCPREQUEST message and then responds with a DHCPACK message including appropriate configuration parameters. If the server has already allocated the IP address requested by the client, the server will send a DHCPNAK instead of a DHCPACK to the client. A client may perform a check routine to verify that the IP address is correct by implementing ARP (Address Resolution Protocol) on a local network segment.

If the client detects that the address is already in use on the local network segment, the client sends a DHCPDECLINE message to the server and initiates the request process again. If the client receives a DHCPNAK (e.g., no acknowledgment) from the DHCP server after sending the DHCPREQUEST, the client will also send a request again.

After being assigned a lease for an IP address, if the client no longer needs an IP address, the client may send a DHCPRELEASE message to the DHCP server indicating that the IP address is no longer needed. Alternatively, a client may extend a lease time of an IP address by generating an appropriate request.

Most computer devices perform a routine exploiting the DHCP protocol discussed above at power-up to automatically retrieve an IP address and connect themselves to a network. For example, a computer device that must lease or be dynamically assigned an IP address may exploit a routine at power-up to automatically enable appropriate network interfaces and thereafter retrieve an IP address from a DHCP server for connecting and communicating over a corresponding network to which the computer device is attached. Thus, in such instances, a user need not manually request assignment of an IP address to connect to a network because the computer device is programmed to automatically perform such a routine at power-up.

SUMMARY

Conventional deployment of the DHCP protocol (and dynamic assignment of IP addresses in general) suffers from certain deficiencies. One such deficiency is that conventional techniques do not support on-demand reassignment of a new IP address without manual intervention by a computer user. For example, a computer user must either reset power on the computer to renew its presently assigned IP address, manually execute a command to initiate an update of a presently assigned IP address, or wait for a lease to expire to be assigned another IP address. Thus, if it is necessary to immediately (e.g., without waiting for a lease to expire) update the host computer's assigned IP address at some time after power-up, the user must either endure non-use of the computer while it is powering down/up again or learn how to execute an appropriate software CLI (Command Line Interface) command to modify an existing IP address without powering down the computer. In either case, it is an inconvenience to the computer user.

One solution to alleviate the computer user from having to perform a manual operation to update a computer's IP address is to reduce a lease time associated with an IP address assigned to the computer device. Upon expiration of a shortened lease, a configuration server communicating with the host computer may automatically assign a new IP address to the computer device without performance of a manual operation on the part of the computer user. A drawback of shortening a lease period is increased network traffic which is generated because the configuration server must more frequently communicate with the computer device to determine whether a present lease of an IP address shall be renewed or replaced with a new IP address. Also, as mentioned, a computer device may have to wait at least a minimal amount of time for a present lease to expire before being assigned a new IP address.

Another solution to alleviate the computer user from having to perform a manual operation to update a computer's IP address is to use the DHCPFORCERENEW command which was added to the DHCP protocol and is described in RFC3203. This new command is issued by a configuration server to the host computer and causes the computer device to contact the configuration server and automatically update its presently assigned IP address. Use of this new command to reconfigure a host computer has several drawbacks. First, present operating systems do not support such a command because it was only recently added to the DHCP protocol. Second, even if operating systems were modified to support the DHCPFORCERENEW command, the implementation of the command would have to be secure enough to prevent malicious hackers from attacking computer devices that support it.

It is an advancement in the art to provide a technique that would alleviate a subscriber at a host computer from having to manually perform an operation to reconfigure itself such as initiate retrieval of a new network address. Additionally, it is an advancement in the art to support automatic reassignment of IP addresses without having to modify computer operating systems currently used in the field. Embodiments of the invention are directed towards facilitating the reassignment of a new IP address with minimal intervention by a computer user.

In one specific embodiment of the invention, a host computer is initially assigned (e.g., during power-up) an IP address for accessing a network based on a corresponding first network service (e.g., a pre-established service provider or service plan). The IP address is assigned for use by the host computer to access the network. For example, on startup, the host computer communicates with a configuration server to obtain an IP address. Using this initially assigned IP address, the host computer is able to access (e.g., via an edge device) web pages distributed by web servers over the network. A web page may include a list of available network service options (e.g., different service providers or types of network service plans) that the subscriber may select for supporting future access to the network via the subscriber's host computer.

The subscriber selects a new service provider (supporting future network communications) by selecting a an entry in the webpage. Upon selection of a new network service by the subscriber, the host computer is automatically assigned a new IP address that supports connectivity to the network via the newly selected network service plan. For example, via use of the web page including available network service options, the subscriber at the host computer selects a new network service on which to access the network (such as the Internet) instead of a previously selected network service. In response to a subscriber's selection of the new network service, the web server detects the subscriber's selection and generates a signal to a configuration server. The signal to the configuration server causes updating of a corresponding map at the configuration server tracking an identity of the host computer and a corresponding network service that the host computer is assigned to access the network.

To facilitate reassignment of a new network address (so that the host computer may access the network via the newly selected network service), the configuration server sends a command (e.g., a DHCPFORCERENEW command) to the host computer for reconfiguration purposes. Ideally, the host computer would execute a reconfiguration routine based upon receipt and execution of the command. As discussed, the host computer may or may not support the command. Embodiments of the invention accommodate reconfiguration even if the host computer does not support execution of the reconfiguration command (e.g., DHCPFORCERENEW command).

For example, in one embodiment, a network interface (e.g., a network edge device, a hub in a private LAN, etc.) intercepts a reconfiguration command intended for receipt and execution by the host computer. In response to intercepting the command (potentially based on knowing that the host computer does not support such a reconfiguration command), the network interface at least temporarily terminates a communication link (e.g., to deny the subscriber and host computer access to the network) through which the host computer previously accessed the network via an old network service. The host computer detects termination of the link (e.g., because it can no longer communicate through the network interface to the network) and automatically executes a routine (such as the INIT-REBOOT process typically employed at power-up) to request and retrieve a new IP address from the configuration server. The new IP address distributed by the configuration server enables the host computer to access the network via a newly selected service provider.

As mentioned, because the host computer is programmed to automatically perform the request for an IP address when the initial link is terminated, the subscriber need not perform any manual operations to initiate reassignment of a new IP address. Nor does the user of the host computer need to be rebooted in order to be assigned a new network address. Instead, as discussed, the host computer automatically initiates communication with the configuration server in response to detecting a termination of the previous communication link which relied on use of a previously assigned network address. Since the configuration server includes an updated mapping associating the host computer to the newly selected network service, the configuration server sends the host computer an IP address (e.g., from a pool of addresses) that enables access to the network via the newly selected network service instead of the old network service. In this manner, a subscriber at the host computer is automatically reassigned a new IP address for accessing the network whether or not it supports a DHCPFORCERENEW command. Thus, embodiments of the invention alleviate the need to update the host computer with a new version of software that supports receipt and execution of the reconfiguration command.

Accordingly, in view of the specific embodiment discussed above, a general embodiment of the invention involves a technique of supporting reconfiguration of a host computer used to access a network. For example, the method of reconfiguring a host computer involves enabling the host computer to access a network as well as receive network messages through a network interface. The network interface intercepts one or multiple network message (or messages) i) received from over the network and ii) destined for receipt by the host computer through the network interface. In response to intercepting the network message, the network interface disables itself or a corresponding communication link used by the host computer to access a network. Disabling the network interface prompts the given host computer to initiate a reconfiguration routine. In one application, disabling the network interface causes the host computer to retrieve configuration information such as a new IP address from a configuration server so that the host computer may again access the network through the network interface but based on the new IP address.

Another general embodiment of the invention involves use of a technique for reconfiguring a host computer utilized to access a network. The technique includes providing the host computer access to the network through a network interface. The network interface forwards network messages received from over the network and to the host computer. At least one of the forwarded network messages includes a command (e.g., a DHCPFORCERENEW command) to initiate reconfiguration of the host computer. After forwarding the network message including the reconfigure command to the host computer, the network interface monitors communications transmitted from the host computer through the network interface (e.g., to a configuration server on the network) to identify whether the host computer executes the command and initiates reconfiguration of the host computer. In other words, if the host computer executes a reconfigure command in a forwarded network message, the host computer will initiate communications through the network interface to a node in the network such as a configuration server. The network interface monitors a content of the communications from the host computer to the configuration server to determine whether the host computer executes the reconfigure command. If not, the network interface disables a communication link enabling the host computer to access the network. Disabling the communication link prompts the host computer to initiate a reconfiguration routine such as the INIT-REBOOT process typically executed at computer power-up to retrieve an IP address similar to previously discussed embodiments.

In one embodiment, disabling the network interface includes terminating a link between the host computer and the network at a link layer of a connection-oriented protocol (e.g., TCP/IP) supporting communications between the host computer and the network through the network interface.

Embodiments of the invention may be combined to support different functionality. For example, in one embodiment, the network interface utilizes a map to identify which of multiple host computers supports execution of reconfigure commands. In such an application, the network interface selectively forwards reconfigure commands to the host computers known to support (e.g., capable of executing) that such commands. The network interface intercepts reconfigure commands directed to host computers that do not support such commands and, accordingly, operates to disable a communication link as discussed above in order to cause reconfiguration of a corresponding host computer.

In the context of a client-server application, a server (e.g., a configuration server) maintains a mapping between a given host computer (e.g., a client) and a corresponding first network service that the given host computer is assigned for accessing the network. The server receives a signal to modify the mapping so that the given host computer is assigned a second network service for accessing the network instead of the first network service. In response to receiving the signal, the server generates a reconfigure command (as discussed) to reconfigure the given host computer which, in turn, results in the given host computer initiating communications to enable the given host computer to access the network via the second network service based on the modified mapping. Thus, the given host computer may be automatically reconfigured (e.g., in response to the link termination) without having to endure non-use of the computer while it is powering down/up again or requiring a user of the given computer to figure out how to execute an appropriate software command to reconnect the given computer to the network.

In further embodiments and yet other independent embodiments of the invention, denying the host computer from accessing the network includes at least temporarily disconnecting a physical link or terminating an electronic signal (e.g., a carrier signal, an acknowledgment signal, a reply signal, etc.) otherwise transmitted to maintain a communication link supporting communications from the host computer. Termination of the link denies the given host computer access to the network. Denial of network access prompts the given host computer to initiate a routine to re-establish a communication link for accessing the network.

In one embodiment, the given host computer initially communicates over the network via a first network service based on a corresponding first assigned network address. Denial of network access (or terminating the link) prompts the given computer to be reassigned a new network address to access the network via a newly selected network service. Thus, prior to modifying the mapping, the server disseminates a first network address to the given host computer to support access to the network via the first network service. After modifying the mapping at the configuration server, the configuration server disseminates a second network address to the given host computer to support access to the network via the newly selected network service. In one embodiment, denial of network access prompts the given host computer to request reassignment of a network address for use by the given host computer to provide access to the network. As discussed above, a configuration server may distribute network addresses via use of the DHCP protocol.

In one embodiment, reception of the signal to modify the mapping includes receiving a selection message identifying that a subscriber at the given host computer selects a second network service on which to support future communications instead of the first network service. For example, a subscriber at the given host computer may select the second network service based on accessing a web page including network service options from a website via use of the first network service.

Selection of one of multiple available network services listed in the web page prompts the web server supporting the web page to transmit a signal to the configuration server to modify the mapping to associate the given host computer with the newly selected network service instead of the first network service. In response, the configuration server updates a mapping associating host computers to corresponding selected network services on which to access the network. In the present example, the subscriber at the given host computer selects a second network service for accessing the network instead of the first network service used to access the web page including network service options.

After the server updates the mapping, there is an instant in time in which the given host computer may be accessing the network service via the first network service even though the subscriber has just selected a second network service on which to access the network. To support a switchover to the second network service, the configuration server transmits a reconfiguration command to the host computer to be reconfigured. The network interface may include a link to the given host computer that is established according to a connection-oriented protocol. For example, the given host computer may be coupled to the network via a network device based on a TCP/IP (Transmission Control Protocol/Internet Protocol) protocol linking the given host computer to the first network service. Upon receipt of the reconfiguration command at the network interface, the network interface terminates communication on the link such that the given host computer no longer detects that it is coupled to the network device. In one embodiment, the network device terminates the link at a link layer of the connection-oriented protocol (e.g., TCP/IP) in response to receiving the command.

Embodiments of the invention may be employed such that a network system and portions thereof support a unique method of configuring host computers to communicate over a network. Use of the aforementioned and following techniques are particularly well-suited for use in network systems that support disseminating configuration information to the given host computer according to DHCP (Dynamic Host Control Protocol) and, more specifically, those that support disseminating network addresses (e.g., IP addresses) for use by host computers that access a network via one of multiple network services as indicated by a configuration mapping in a configuration server. However, note that embodiments of the invention are not limited to applications supporting use of the DHCP protocol, dissemination of network addresses, or reconfiguration in general.

Other embodiments of the invention include a computer system, such as a data communications device, computerized device, or other device configured with software and/or circuitry to process and perform all (or a portion thereof) of the method operations noted above and disclosed herein as embodiments of the invention. In such embodiments, the device, such as a data communications device, comprises one or more communications interfaces (e.g., network interfaces), a memory (e.g., any type of computer readable medium, storage or memory system), a processor and an interconnect mechanism connecting the communications interface, the processor and the memory. In such embodiments, the memory system is encoded with an application that causes the computer system to perform any part and/or all of the method embodiments, steps and operations explained herein as embodiments of the invention. In other words, a computer, switch, router, hub, bridge, edge device, configuration server, or other communication or data serving device that is programmed or otherwise configured to operate as explained herein is considered an embodiment of the invention.

One embodiment of the present invention is directed to a computer program product that includes a computer readable medium having instructions stored thereon for configuring a network node to support routing of network messages. The instructions, when carried out by a processor of the data communication device, cause the processor to perform the steps of: a.) enabling the host computer to access a network through a network interface; b.) intercepting a network message i) received from over the network and ii) destined for receipt by the host computer through the network interface; and c.) in response to intercepting the network message, disabling the network interface to prompt the host computer to perform a reconfiguration routine. Other arrangements of embodiments of the invention that are disclosed herein include software programs to perform any of the method embodiment steps and operations summarized above and disclosed in detail below.

Embodiments of the invention may be implemented by computer software and/or hardware mechanisms within any type of computing apparatus. It is to be understood that the certain embodiments of the invention can be embodied strictly as a software program, as software and hardware, or as hardware and/or circuitry alone such in a content engine coupled to a network. The features of the invention, as explained herein, may be employed in data communications devices, computerized devices and/or software systems for such devices such as those manufactured by Cisco Systems, Inc. of San Jose, Calif.

Figure 1:
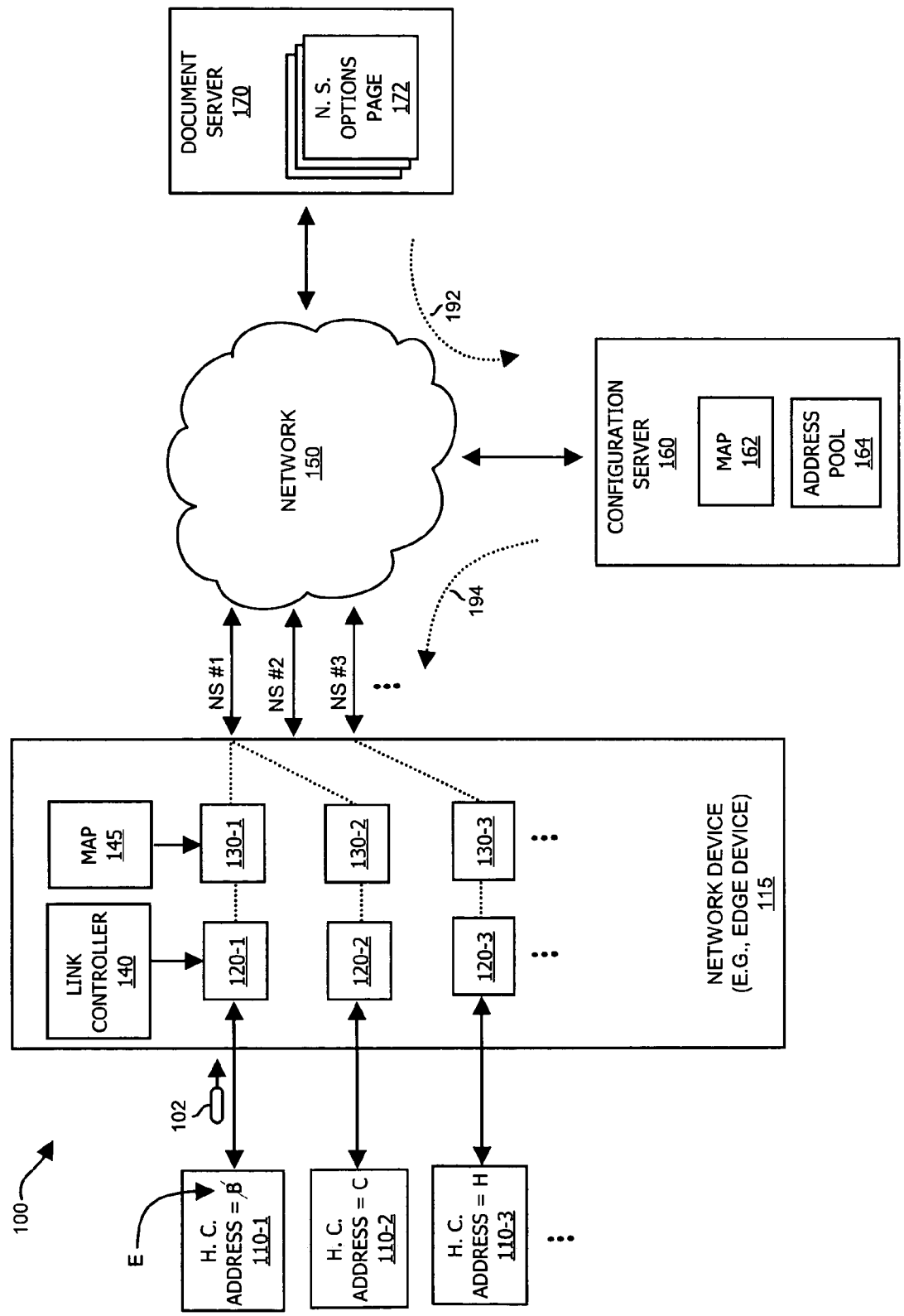
FIG. 1 is a system block diagram of a communication system supporting reconfiguration of a host computer according to an embodiment of the invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF EMBODIMENTS

An embodiment of the present invention is directed to techniques for controlling IP address loading by the host computer from a remote device. In particular, the remote device (e.g., a configuration server) breaks a link (e.g., a logical relationship at an L2 layer established between the host computer and adjacent ISP equipment) supported by a network edge device which causes the host computer to automatically perform a new DHCP round of handshaking with a DHCP server to obtain a new IP address. Accordingly, such operation provides a well suited means for changing ISP (Internet Service Provider) subscriptions that rely on a change from one IP address to another. Moreover, such operation alleviates the need for rebooting the host computer as well as the need to manually enter commands on a command line interface of the host computer which most computer users do not know how to use.

Accordingly, an embodiment of the invention enables a host computer to initially access a network via use of a first IP address assigned during a power-up phase when a computer is first turned on. For example, based on use of the first IP address, a subscriber at the host computer is capable of accessing information such as web pages distributed by web servers over the network via use of a first network service. In one application, the subscriber accesses a web page and selects a new network service to access web pages over the network. Upon selection of the new network service, the host computer is assigned a new IP address that supports connectivity to the network via the newly selected network service.

For example, in response to a subscriber's selection of the second network service to access the network, the web server detecting the selection generates a signal to a configuration server to update an entry of a map that tracks an identity of the host computer and a corresponding network service that the host computer is assigned to access the network. To facilitate reassignment of a new network address (such that the host computer may access the network via the second network service), the configuration server sends a command to (e.g., a DHCPFORCERENEW command) to the host computer. In one application, a network interface (through which the given host computer accesses a network) intercepts the reconfigure command and terminates a communication link through which the given host computer communicates to access the network. Termination of the communication link prompts the given host computer to initiate a reconfiguration routine for assignment of a new network address. Alternatively, the network interface forwards the reconfigure message to the given host computer and monitors communications from the given host computer to determine whether it executes the reconfigure command. If not, the network interface terminates a communication link prompting the given host computer to initiate a reconfiguration routine for assignment of a new network address.

In response to denying access to the network via the first network service, the host computer assumes the link is not usable and thus requests another IP address from the configuration server to access the network. Since the configuration server includes an updated mapping associating the host computer to the second network service as requested, the configuration server sends the host computer an IP address that enables access to the network via the second network service instead of the first network service. In this manner, a subscriber at the host computer is assigned a new IP address for accessing the network.

FIG. 1 is a block diagram of communication system 100 according to an embodiment of the invention. As shown, communication system 100 includes host computers 110-1, 110-2, 110-3, . . . (collectively, host computers 110), network device 115 (e.g., an edge device), network 150, document server 170, and configuration server 160. Network device 115 includes link controller 140, links 120-1, 120-2, 120-3, . . . , (collectively, links 120) map 145, and message forwarding module 130-1, 130-2, 130-3, . . . , (collectively, message forwarding modules 130). Document server 170 generates and serves network service options page 172. Configuration server 160 includes map 162, and address pool 164.

In general, communication system 100 enables host computers 110 to access configuration server 160 and obtain network addresses supporting communication over network 150 (e.g., a communication network supporting transmission of TCP/IP data packets). In one application, network addresses are IP addresses assigned to host computers 110 by configuration server 160 according to the DHCP protocol.

As shown, host computer 110-1 transmits message 102 (e.g., one or more data packets formatted according to TCP/IP) to network device 115. Link 120-1 conveys message 102 to message forwarding module 130-1 that, in turn, forwards message to network 150 via one of multiple network services (e.g., NS #1, NS #2, NS #3 , etc.). Network services may include one or multiple service plans provided by each of different ISPs or different service plans available from the same ISP.

Link controller 140 (in network device 115) receives commands 194 from configuration server 160 to terminate selected links 120 and thus deny a corresponding host computer 110 access to network 150. Denial of network access may be achieved in a number of ways depending on a type of link 120 coupling a corresponding host computer 110 to network 150. For example, in one embodiment, link 120-1 is configured as a hard-wired link such as one or multiple pairs of twisted wires physically coupling host computer 110-1 to network device 115 via link 120-1. Upon receipt of command 194 from configuration server 160 to deny network 150 access, link controller 140 physically disconnects link 120-1 via a mechanical or electrical switch at network device 115 such that host computer 110-1 is physically "unplugged" from network device 115. Thus, connectivity between the host computer 110-1 and network device 115 (and ultimately network 150) is controlled, not at the host computer 110-1, but instead at the network device 115. Host computer 110-1 detects the "unplugged" condition and may initiate a routine (e.g., INIT-REBOOT) to obtain another network address (e.g., network address E) for accessing network 150. This will be discussed in more detail later in the specification.

In another embodiment, link 120-1 (as well as any other links 120) is configured to support wireless communications. In such an embodiment, host computer 110-1 communicates with network device 115 via a wireless link. In response to receiving command 194 to deny network 150 access, link controller 140 terminates wireless communications (potentially including transmission of a carrier frequency on which data is transmitted) from network device 115 to host computer 110-1. Host computer 110-1 detects the "non-responsive" condition of network device 115 and may initiate a routine (e.g., INIT-REBOOT) to obtain another network address (e.g., network address E) for accessing network 150.

In yet another embodiment, link 120-1 (as well as the other links 120) is configured to support communications via a modem. In such an application, host computer 110-1 communicates with network device 115 on a channel designated to carry communications between the host computer 110-1 and network device 115. In response to receiving command 194 to deny network access, link controller 140 terminates transmission of information on the channel from network device 115 to host computer 110-1. Host computer 110-1 detects the "non-receipt" of the channel and may initiate a routine (e.g., INIT-REBOOT) to obtain another network address (e.g., network address E) for accessing network 150.

Map 145 (in network device 115) includes a listing of network addresses and corresponding network services upon which messages are to be forwarded. Thus, message forwarding module 130-1 forwards message 102 (including a corresponding network address) along to network 150 via NS #1 depending on a corresponding network address in message 102 identifying host computer 110-1 as the originator. In a similar way, message forwarding modules 130 forward messages from host computers 110 to network 150 via appropriate network services as identified by map 145.

Document server 170 serves documents such as network service options page 172 to host computers 110 upon request. Network service options page 172 may include a listing of network services available for selection by to a subscriber at a corresponding host computer 110.

Configuration server 160 includes map 162 and address pool 164. Map 162 tracks which network service (e.g., NS #1, NS #2, NS #3, . . . ) may be assigned for use by a given host computer 110 to access network 150 address pool 164 which includes network addresses assigned to host computers 110 for accessing network 150. Address pool 164 includes network addresses that may be assigned to host computers 110 for accessing network 150 via an appropriate network service.

Figure 2:
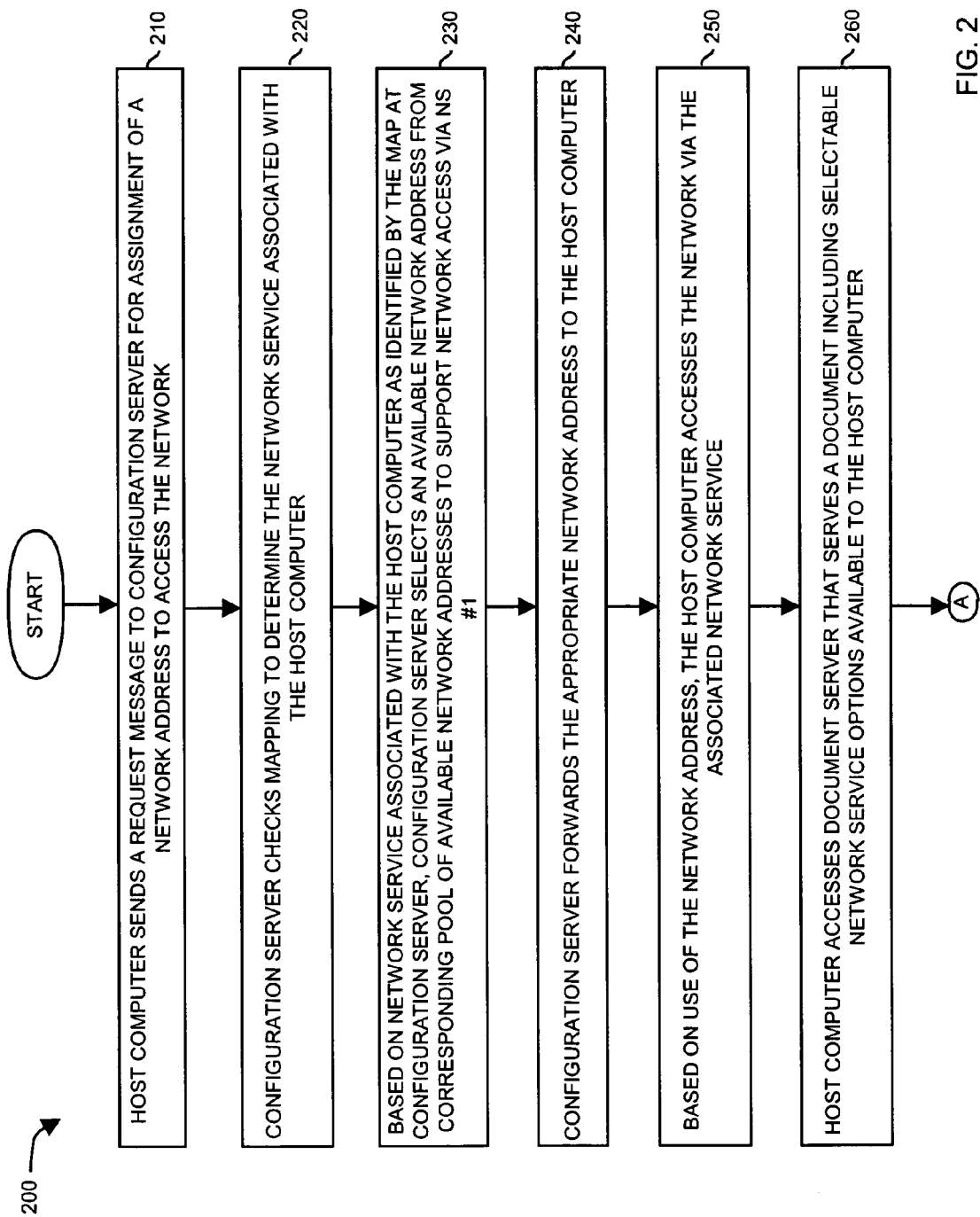
FIGS. 2 and 3 combine to form a flowchart describing functionality the communication system in FIG. 1 according to an embodiment of the invention.
Figure 3:
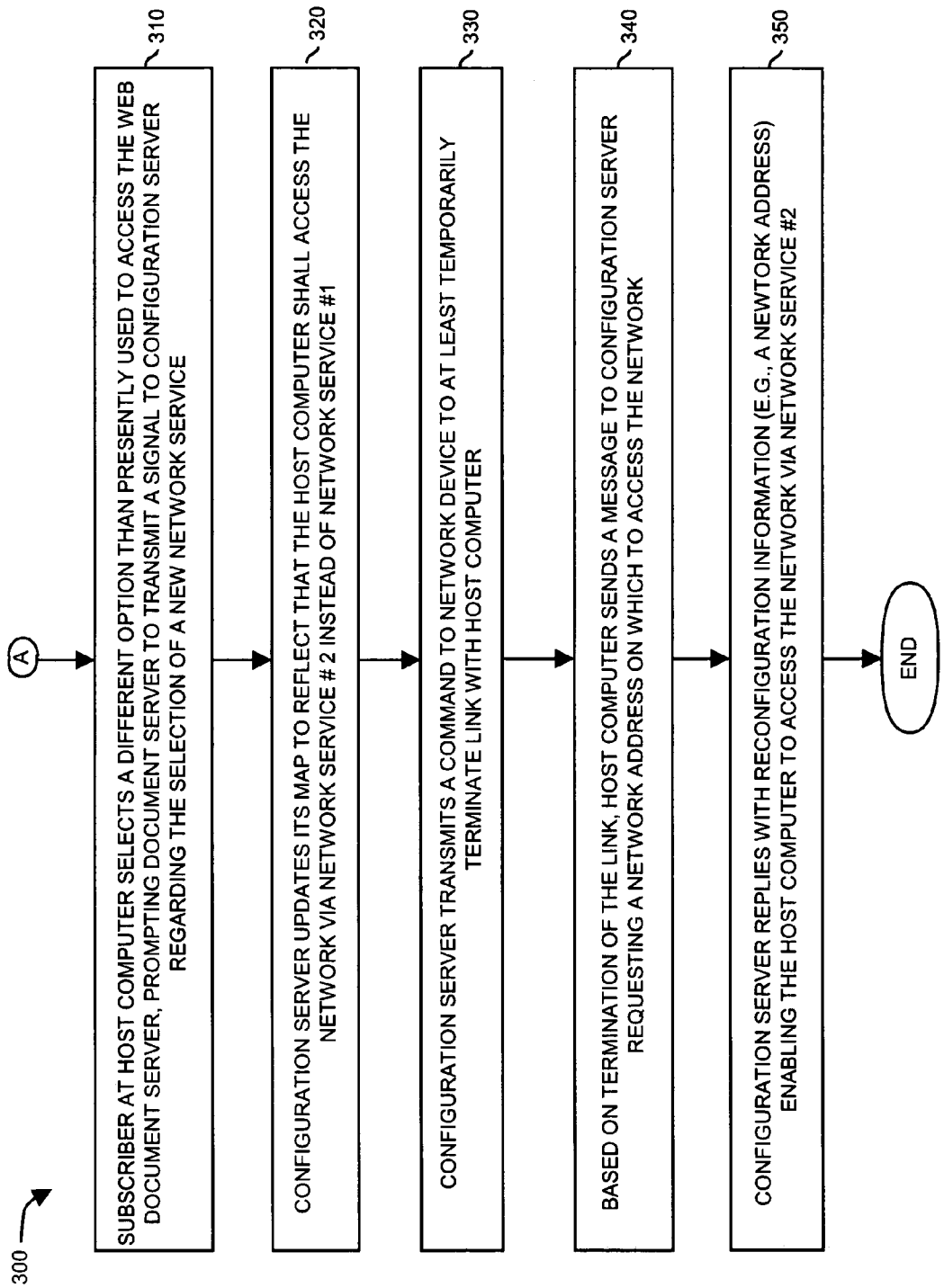

FIGS. 2 and 3 combine to form a flowchart 200 and flowchart 300 illustrating functionality of communication system 100 in FIG. 1 according to an embodiment of the invention.

Referring to FIG. 2, in step 210, host computer 110-1 sends a request message 102 (e.g., based on use of the DHCP protocol) to configuration server 160 for assignment of a network address with which to access information such as web pages over network 150.

In step 220, the configuration server 160 checks a map 162 to determine a network service (e.g., network service #1, network service #2, network service #3, etc.) associated with the host computer 110-1 that it is assigned for accessing network 150.

In step 230, the configuration server 160 selects an available network address from address pool 164. The network address selected by the configuration server 160 will enable host computer 110-1 to access network 150 via network service #1 (NS #1).

In step 240, the configuration server 160 forwards network address B to be its origin address and enable host computer 110-1 to communicate with network 150 via NS #1. For example, assignment of a network address enables host computer 110-1 to both transmit and receive messages.

In step 250, host computer 110-1 accesses network 150 via use of network address B. Map 145 indicates that messages having a network address falling in a range A-D (e.g., A, B, C and D) are transmitted to network 150 via network service #1. Thus, messages from host computer 110-1 are forwarded via message forwarding module 130-1 (e.g., a multiplexer or routing function) to network 150 via network service #1.

In step 260, host computer 110-1 accesses document server 170 and retrieves a network service options page 172 including selectable network services. Network service options page 172 includes selectable network services such as NS #1, NS #2, NS#3, etc.

Referring now to FIG. 3, in step 310, the subscriber (e.g., a user) at host computer 110-1 selects a different option than presently used NS #1 to access pages from document server 170. In response to the subscriber at host computer 110-1 selecting, for example, network service #2, document server 170 transmits a signal 192 (e.g., a network message) to configuration server 160 regarding the selection by host computer 110-1 of a new service.

In step 320, configuration server 160 updates map 162 to reflect that host computer is assigned to access the network 150 via network service #2 instead of previously used network service #1.

In step 330, configuration server 160 transmits a command 194 to network device 115 to at least temporarily terminate or disable link 120-1 to deny host computer 110-1 access to network 150. For example, based on receipt of command 194 at network device 115, link controller 140 disables link 120-1.

In step 340, termination or disabling of link 120-1 causes host computer 110-1 to initiate a routine to establish a communications with network device 115 again. For example, host computer 110-1 sends a message to configuration server 160 requesting another network address on which to access network 150.

In step 350, based on reviewing map 162, configuration server 160 replies with reconfiguration information (e.g., a second network address) enabling host computer 110-1 to access network 150 via network service #2. For example, configuration server 160 sends host computer network address E to be used instead of previously sent network address B. Thereafter, host computer 110-1 uses address E as an origin address and message forwarding module 130-1 forwards messages from host computer 110-1 to network 150 on network service #2.

Thus, based on the aforementioned method, configuration server 160 initially assigns (e.g., during power-up) an IP address B to host computer 110-1 based on a corresponding network service #1 (e.g., a service provider or service plan) assigned for use by the host computer 110-1 to access the network 150. Using this initially assigned IP address B, a subscriber at the host computer 110-1 accesses network service options page 172 distributed by document server 170 over the network 150. Network service options page 172 includes available network service options (e.g., different service providers or types of network service plans) that the subscriber may select for supporting future access to the network 150 via host computer 110-1.

Upon selection of a new network service (e.g., NS #2) by a subscriber, the host computer 110-1 is automatically assigned a new IP address E that supports connectivity to the network 150 via the newly selected network service #2. For example, via use of a web page including available network service options, the subscriber at the host computer 110-1 selects a second network service (e.g., NS #2) on which to access the network 150 (such as the Internet) instead of the first network service (NS #1) as initially used to access network 150. In response to a subscriber's selection of the second network service by clicking on an appropriate network service in the network options web page 172 retrieved and displayed at host computer 110-1, the document server 170 detecting the selection, in turn, generates signal 192 to configuration server 160 to update an entry of map 162 tracking an identity of the host computer 110-1 and a corresponding network service that the host computer 110-1 is assigned to access the network 150.

To facilitate reassignment of a new network address (such that the host computer 110-1 may access the network 150 via the second network service such as NS #2), the configuration server 160 sends a command 194 to terminate a link 120-1 (e.g., to deny the subscriber and host computer 110-1 access to the network 150) through which the host computer 110-1 previously accessed the network 150 via the first network service NS #1. The host computer 110-1 detects termination of the link 120-1 and, again, executes a routine to request and retrieve an IP address from the configuration server 160. The routine enables the host computer 110-1 to be reassigned a new IP address (e.g., address E) to access the network 150 via the second network service NS #2. Because the host computer 110-1 is programmed to automatically perform the request for an IP address when the initial link 120-1 is terminated, the subscriber need not perform any manual operations to initiate reassignment of a new IP address. Instead, the host computer 110-1 automatically initiates communication with the configuration server 160 in response to detecting a termination, disablement, or lack of communications on link 120-1 previously used to access network 150 via NS #1. Since the configuration server 160 includes an updated map 162 associating the host computer 110-1 to the second network service NS #2, the configuration server 160 sends the host computer 110-1 an IP address that enables access to the network 150 via the second network service NS #2 instead of the first network service NS #1. In this manner, a subscriber at the host computer 110-1 is automatically reassigned a new IP address (e.g., network address E) for accessing servers and the like over network 150.

Figure 4:
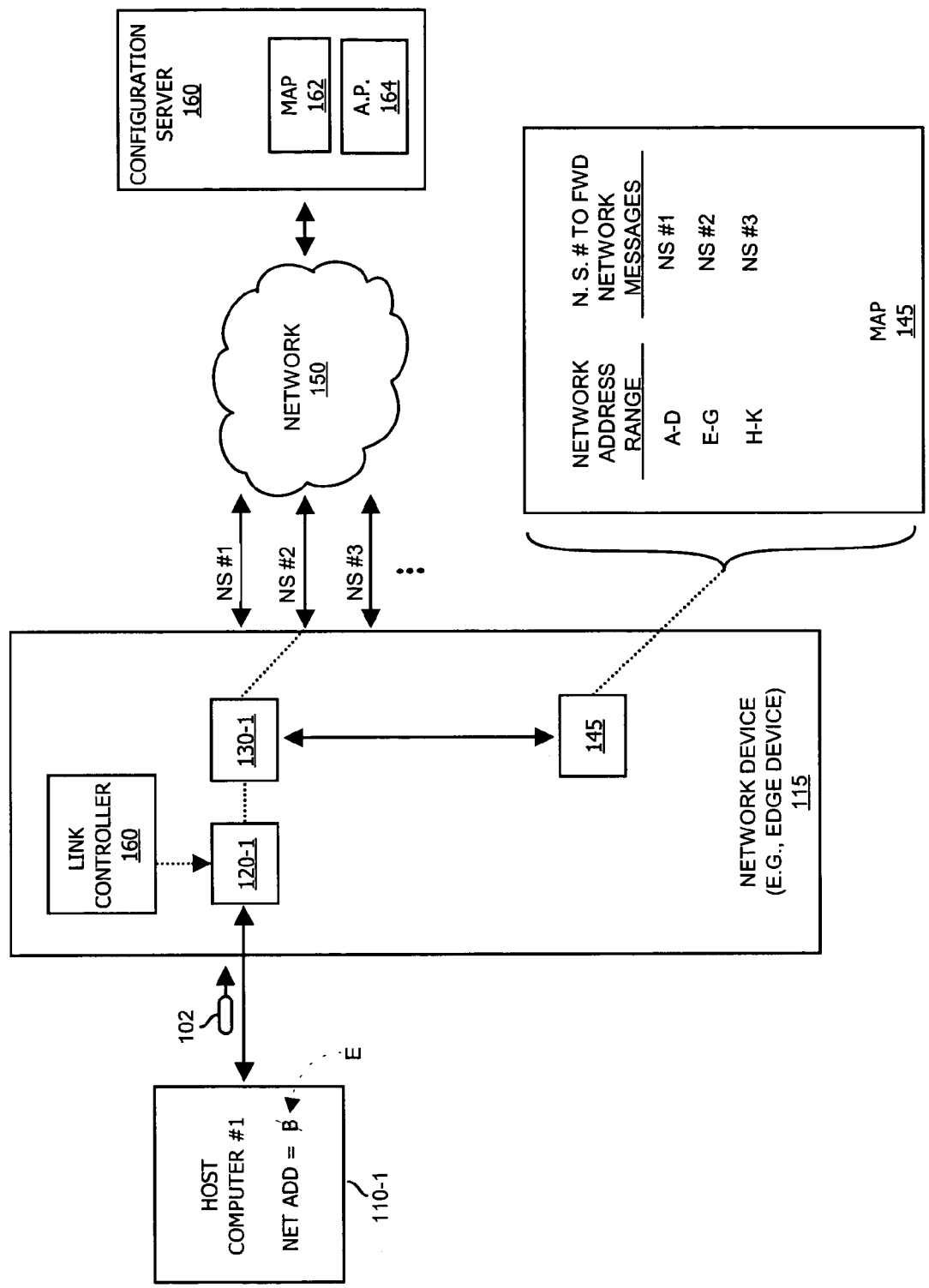
FIG. 4 is a detailed block diagram of a network device and corresponding map to forward messages according to an embodiment of the invention.

FIG. 4 is a more detailed block diagram of network device 115 according to an embodiment of the invention. As shown, host computer 110-1 is initially assigned network address B to communicate through network device 115 via NS #1. Map 145 includes a listing of network address ranges and corresponding network services on which to forward messages to network 150. For example, when host computer 110-1 is initially assigned network address B, message forwarding module utilizes map 145 to determine that messages 102 having a network address B are to be forwarded to network 150 via NS #1. When host computer 110-1 is assigned new network address E, message forwarding module 130-1 forwards messages 102 to network 150 via NS #2 based on use of map 145.

Figure 5:
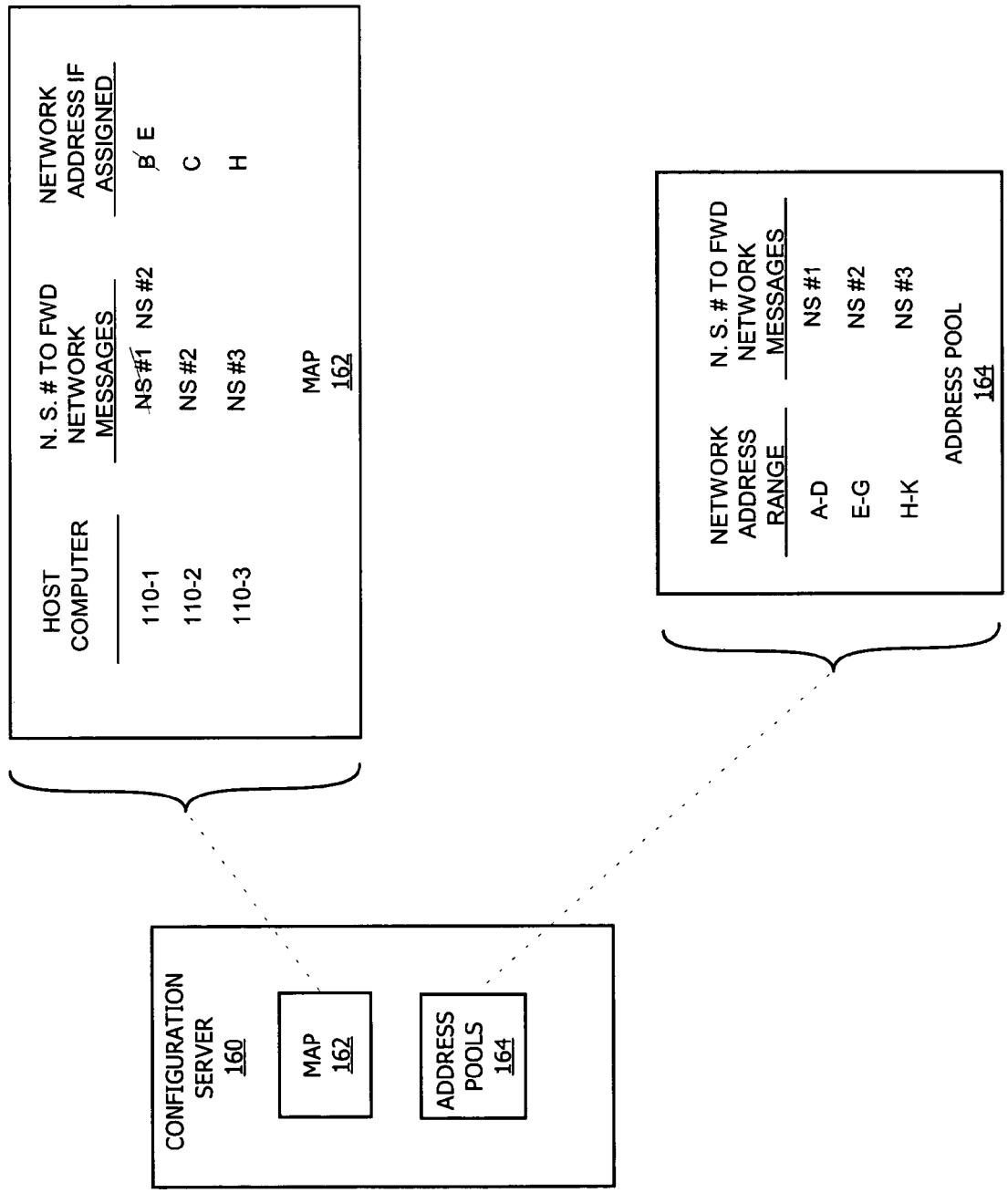
FIG. 5 is a detailed block diagram of a configuration server that maintains and provides configuration information according to an embodiment of the invention.

FIG. 5 more particularly illustrates configuration server 160 according to an embodiment of the invention. As shown, map 162 includes a listing of host computers 110 and corresponding types of network services (e.g., NS #1, NS #2, NS #3, . . . ) upon which messages shall be forwarded to network 150. Address pool 164 includes a range of network addresses and associated network services that, if presently unassigned for use by a host computer 110, may be assigned to a host computer 110 to communicate through network device 115 and access network 150. As discussed, map 145 includes a similar listing to identify on which network service to forward messages to network 150. Thus, when a host computer 110 requests assignment of a network address, configuration server 160 checks map 162 to identify a network service associated with the host computer 110 and thereafter assigns an available (e.g., unused) network address from address pool 164 for use by the host computer 110 to access network 150.

In the present example, configuration server 160 initially assigns host computer 110-1 network address B to access network 150 via corresponding assigned network service #1. As discussed, configuration server 160 receives a signal 192 from document server 170 to change the provided service to NS #2. In response, configuration server 160 modifies map 162 to produce an updated mapping and associate host computer 110-1 to NS #2. Upon request of a new network address to access network 150, configuration server 160 assigns host computer 110-1 network address E such that future communications to network 150 shall be supported by NS #2 instead of NS #1.

Figure 6:
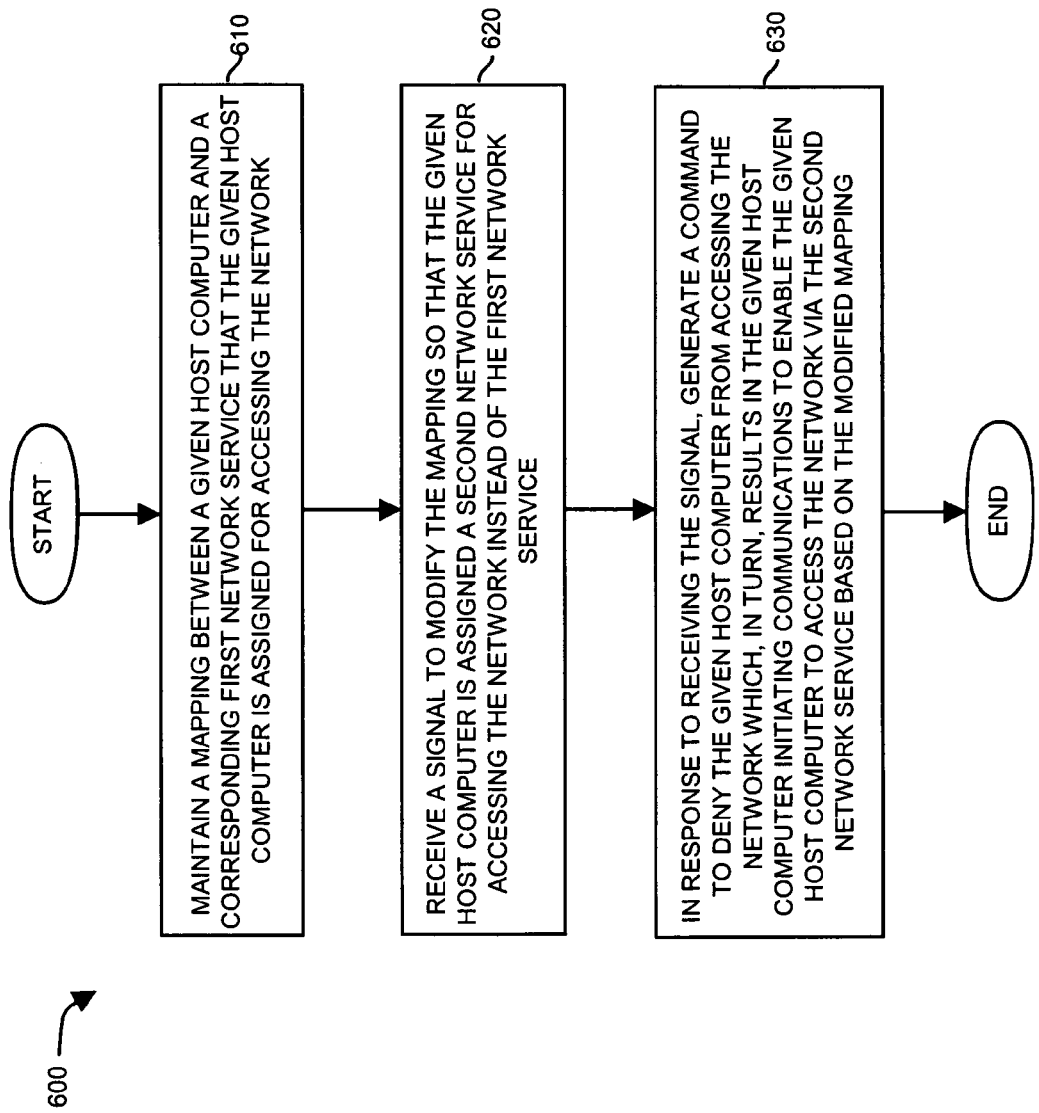
FIG. 6 is a flowchart illustrating a method of supporting reconfiguration of a host computer according to an embodiment of the invention.

FIG. 6 is a flowchart 600 illustrating a method of supporting reconfiguration of a host computer 110-1 according to an embodiment of the invention. Flowchart 600 is well-suited for execution as a software program on configuration server 160 but may implemented in other applications and modes as well.

In step 610, configuration server 160 maintains a mapping between a given host computer 110-1 (e.g., a client) and a corresponding first network service, NS #1, that the given host computer 110-1 is assigned for accessing the network 150.

In step 620, the configuration server 160 receives a signal 192 to modify the map 162 so that the given host computer 110-1 is assigned a second network service, NS #2, for accessing the network 150 instead of the first network service, NS #1.

In step 630, in response to receiving the signal 192, the configuration server 160 generates a command 194 to deny the given host computer 110-1 from accessing the network 150 which, in turn, results in the given host computer 110-1 initiating communications to enable the given host computer 110-1 to access the network 150 via the second network service NS #2 based on the modified map 162. Thus, the given host computer 110-1 may be automatically reconfigured (e.g., in response to the link 120-1 termination) without having to endure non-use of the host computer 110-1 while it is powering down/up again (to be reassigned a new IP address) or requiring a user of the given host computer 110-1 to figure out how to execute an appropriate software command (e.g., a CLI command) to reconnect or reestablish a software link with host computer 110-1 to the network 150.

In further embodiments and yet other independent embodiments of the invention, generating the command 194 to deny host computer 110-1 from accessing the network 150 includes providing the command 194 (via configuration server 160) to at least temporarily disconnect a physical link or terminate an electronic signal (e.g., a carrier signal, an acknowledgment signal, a reply signal, etc.) otherwise transmitted between host computer 110-1 and network device 115 to maintain the communication link 120-1 supporting communications (e.g., messages 102) from the given host computer 110-1 to the first network service, NS #1. Termination of link 120-1 or failure to forward network messages in general denies host computer 110-1 access to network 150. Denial of network access prompts host computer 110-1 to initiate a routine to re-establish a communication link 120-1 to access the network 150 via the second network service NS #2 according to modified map 162 now indicating that host computer 110-1 shall hereinafter access network 150 via NS #2.

In one embodiment, host computer 110-1 initially communicates over the network 150 via the first network service NS #1 via use of a first network address and denial of network access (or terminating the link) prompts the given computer to be reassigned a second network address to access the network 150 via a second network service. Thus, prior to modifying map 162, the configuration server 160 disseminates a first network address to the given host computer 110-1 to support access to the network 150 via the first network service. After modifying the map 162, the configuration server 160 disseminates a second network address to the given host computer 110-1 to support access to the network 150 via the second network service. In one embodiment, denial of network access prompts the given host computer 110-1 to request reassignment of a network address for use by the given host computer 110-1 to access network 150. As discussed above, configuration server 160 may provide the second network address.

In one embodiment, reception of signal 192 at configuration server 160 to modify map 162 includes receiving a selection message identifying that a subscriber at the given host computer 110-1 selects a second network service on which to support future communications instead of the first network service. For example, a subscriber at the given host computer 110-1 may select the second network service based on accessing a web page (e.g., NS options page 172) including network service options from a document server 170 via use of the first network service.

Selection of the one of multiple available network services via the NS options page 172 prompts the document server 170 to transmit a signal 192 to the configuration server 160 to modify the map 162 to associate the given host computer 110-1 with the second network service instead of the first network service. In response, the configuration server 160 updates map 162 associating host computer 110-1 to corresponding selected network services on which to access the network 150. In the present example, the subscriber at the given host computer 110-1 selects the second network service NS #2 for accessing the network 150.

After the configuration server 160 updates the map 162, there is an instant in time in which the given host computer may be accessing the network 150 via the first network service (prior to expiration of the present lease associated with network address B) even though a subscriber at host computer 110-1 has just selected a second network service on which to access the network 150. To support a switchover to the second network service, the configuration server 160 transmits command 194 to deny network access to host computer 110-1 by transmitting a command 194 to network device 115 disposed between the host computer 110-1 and the network 150 being accessed. The network device 115 may include a link 120-1 to the given host computer 110-1 that is established according to a connection-oriented protocol such as TCP/IP. For example, the given host computer 110-1 may be coupled to the network 150 via a network device 115 based on a TCP/IP (Transmission Control Protocol/Internet Protocol) protocol linking the given host computer 110-1 to the first network service NS #1. Upon receipt of the command 194 at the network device 115 to terminate network access, the network device 115 terminates communication on link 120-1 such that the given host computer no longer detects that it is coupled to the network device. In one embodiment, the network device terminates the link 120-1 at a link layer (e.g., layer 2) of the connection-oriented protocol (e.g., TCP/IP) in response to receiving the command 194.

In response to detecting termination of the communication link 120-1, the given host computer 1 10-1 initiates a routine to re-establish a link with the network device 115 to access the network 150 via the second network service according to the modified map 162 using a new network address. For example, the routine to re-establish a link may involve the given computer generating a DHCP request message to obtain another valid IP address with which to communicate over the network 150 via an appropriate network service. In the present example, the configuration server 160 will reassign the given host computer 110-1 an IP address enabling access to the network 150 via the second network service instead of the first network service.

According to conventional techniques as discussed in the background above, the DHCP specification in RFC 2131 and RFC 2132 do not provide for any mechanism through which a configuration server can cause a DHCP client to be assigned a new address prior to the expiration of an existing network address lease. In RFC 3203, "DHCP reconfigure extension" describes a message that a server may send to a client to force the client to renew the lease on its address immediately. However, as mentioned, RFC 3203 is not known to be implemented in any DHCP clients because of potential security problems.

There are certain situations when it is desirable that a configuration server such as configuration server 160n FIG. 1 has the ability to initiate a DHCP message exchange through which host computer 110-1 is assigned a new IP address before expiration of the lease of a network address currently assigned to the host computer 110-1. For example, in one embodiment, via configuration server 160, a Managed Service Provider (MSP) may assign use of a network address (e.g., network address B) to host computer 110-1 from an address pool including available network addresses provided by ISPs (Internet Service Providers) carried by the MSP. If a host computer 110-1 selects a new ISP on which to access network 150 via selection of NS #2 in lieu of NS #1, the host computer 110-1 is preferably assigned a new network address (e.g., network address E) prior to the expiration of the leased network address B from the previous ISP.

In a specific embodiment, the invention addresses the problem of controlling host computer 110-1 such as a DHCP client through the use of the L2 interface to the host computer 110-1. When network device 115 is notified via command 194 to tear down link 120-1, network device 115 causes an L2 level disconnect at link 120-1 between network device 115 and host computer 110-1. The L2 connection status indicating disconnection of host computer 110-1 causes host computer 110-1 to, in turn, contact the configuration server 160 prior to T1 as specified by RFC 2131. For example, the CLI commands for a network device manufactured by Cisco, Inc., "shutdown" and "no shutdown" would provide this desired effect for a client connected through an Ethernet port. The host computer 110-1 client interprets this event as a "disconnection from the local network", which causes the host computer 110-1 (e.g., a DHCP client) to execute code to send a DHCPREQUEST message to the configuration server 160. The configuration server 160 responds with a DHCPNAK message, indicating that the host computer's network address B is no longer valid. The host computer 110-1 responds with a DHCP message exchange described in section 3.1 of RFC 2131 to obtain its new network address from the configuration server 160.

As previously discussed, use of the DHCPFORCERENEW message in RFC 3203 to reconfigure a host computer with a new network address is not widely implemented because it has potential security issues. In addition to potential security issues, there is no easy way to retrofit processing of the DHCPFORCERENEW message into existing clients without deployment of a new operating system code from a vendor such as Microsoft. Thus, one benefit of implementing the above technique to reassign a new network address prior to expiration of a current lease is that such an implementation does not require any change on the part of existing software such as an operating system deployed by host computers 110 (e.g., DHCP clients). More specifically, according to one embodiment of the invention, disconnection of the host computer 110-1 from the network device 115 and network 150 causes the host computer 110-1 to contact the server from INIT-REBOOT state prior to expiration of the current lease (more precisely, prior to time T1, when the client would normally try to contact the DHCP server to extend its current lease).

Figure 7:
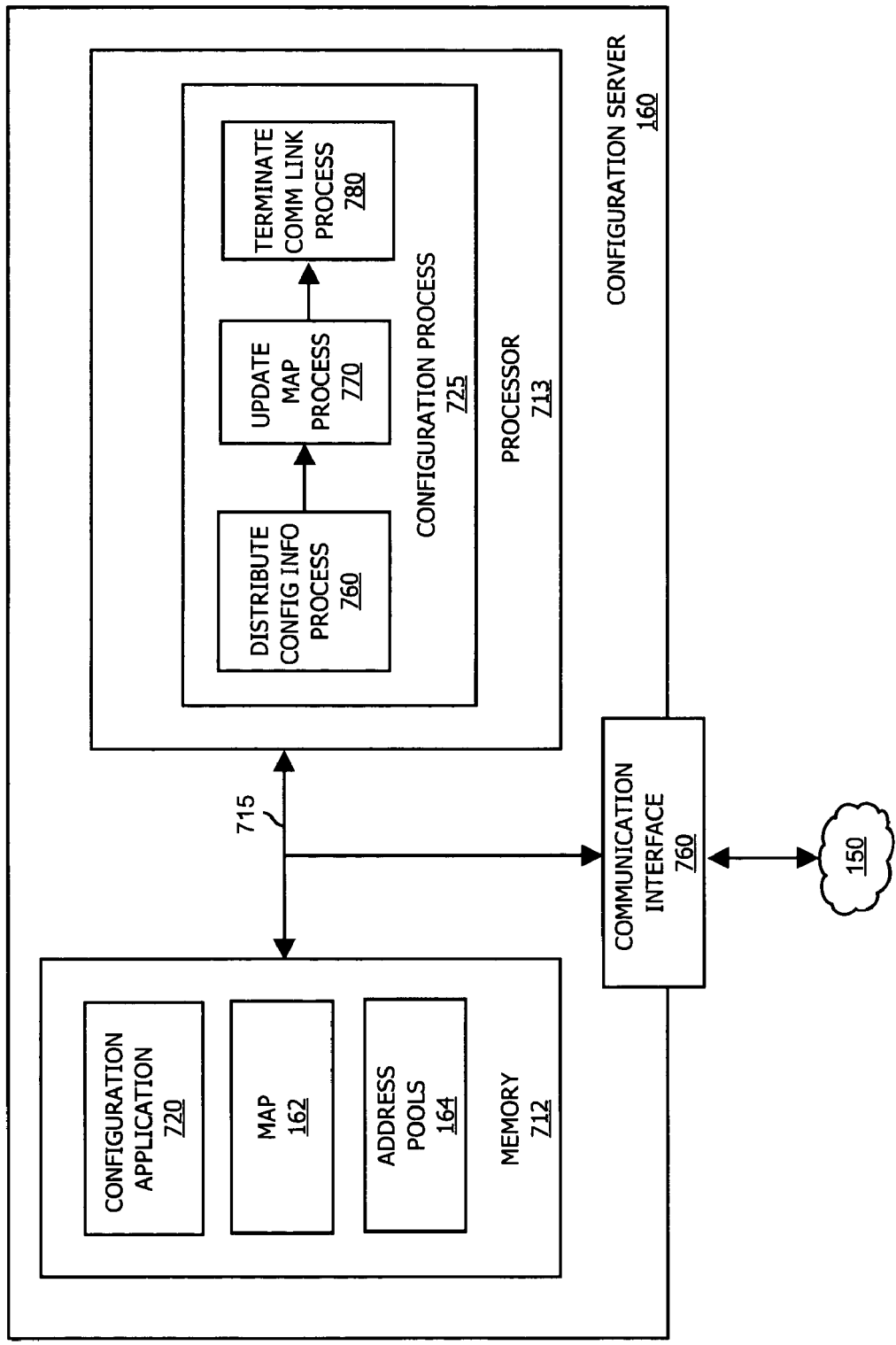
FIG. 7 is a block diagram of a suitable device for executing the flowchart in FIG. 6 according to an embodiment of the invention.

FIG. 7 is a block diagram of a hardware platform suitable for executing flowchart 600 in FIG. 6 (such a computer program) according to an embodiment of the invention. According to one arrangement, configuration sever 160 is a computerized device including interconnect 715 such as a data bus or other circuitry interconnecting memory 712, processor 713, and communication interface 760. Processor 713 may be any type of central processing unit, microprocessor, processing device, controller of other electronic circuitry capable of accessing configuration application 720 to execute, run, interpret, or otherwise operate configuration application 720 to process, forward, and satisfy requests for network addresses from host computers 110 according to embodiments of the invention as explained herein. In other words, configuration application 720, may be embodied as one or multiple software programs that enable configuration server 160 (and similar types of devices) to satisfy requests for requests for network addresses and generate commands to deny access to network 150 as discussed.

Memory 712 stores configuration application 720, as well as map 162 and address pool 164. In general, configuration application 720 in memory 712 represents software code, data and/or logic instructions executed by processor 713. When such code is executed, processor 713 creates distribute configuration information process 760, update map process 770, and terminate communication link process 780.

In another arrangement, configuration server 160 includes a set of specially programmed integrated circuits (ICs) (e.g., Field-Programmable Gate Arrays, Application Specific ICs, etc.) to implement flowchart 600 and related functions. In yet another arrangement, configuration server 160 includes a combination of programmable ICs and processor 713 to support the techniques of the present invention.

Figure 8:
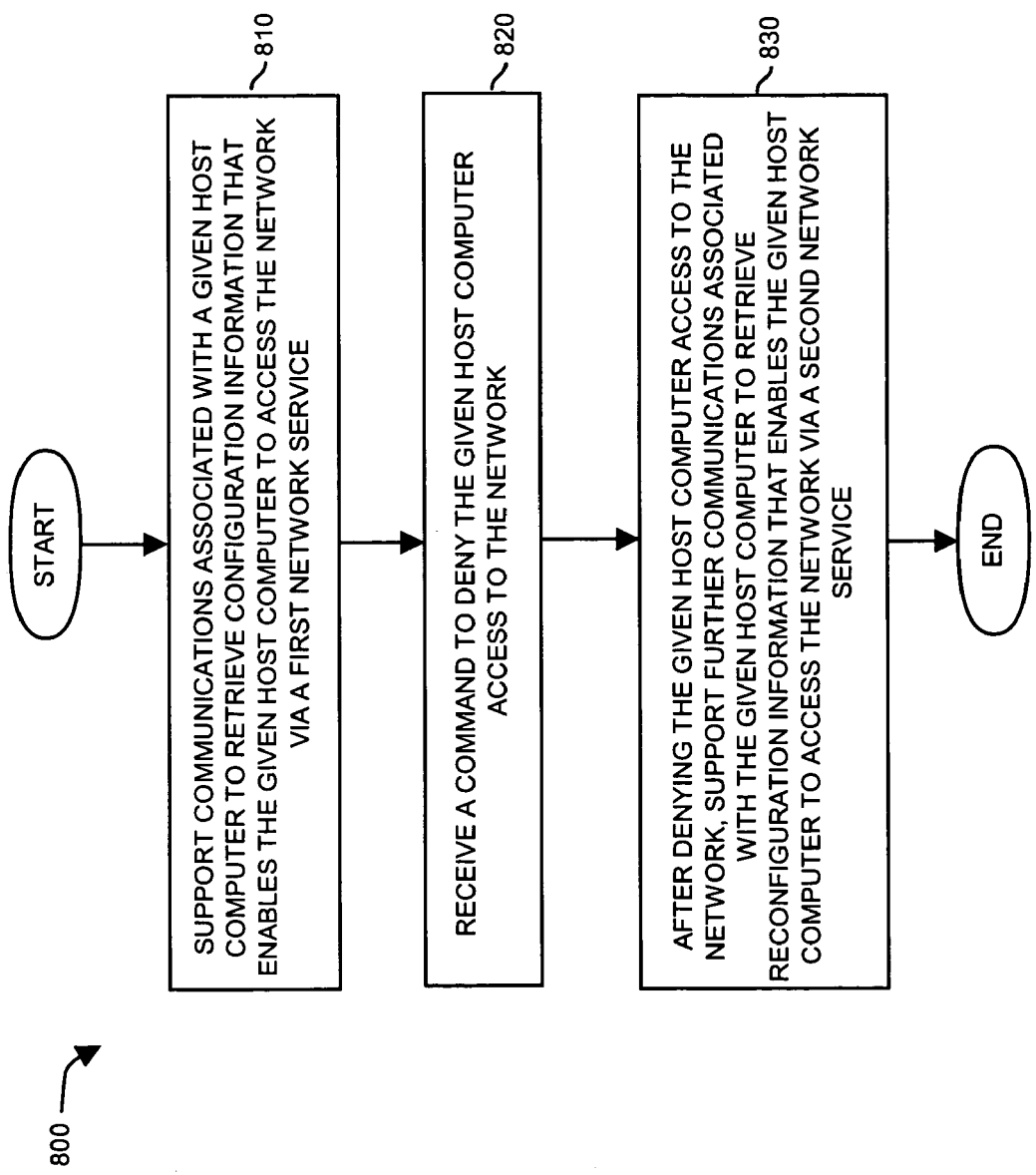
FIG. 8 is a flowchart illustrating a method of supporting reconfiguration of a host computer according to an embodiment of the invention.

FIG. 8 is a flowchart 800 illustrating a method of supporting reconfiguration of host computers 110 according to an embodiment of the invention. Flowchart 800 is well-suited for execution as a software program on network device 115 but may implemented in other applications and modes as well.

In step 810, network device 115 (e.g., a network edge device that supports coupling one or more computers to a network via appropriate network services) supports communications from host computer 110-1 to the configuration server 160 in order to retrieve configuration information such as an IP address that, in turn, enables the given host computer 110-1 to access the network 150 via a first network service NS #1.

In step 820, network device 115 receives a command 194 to deny the given host computer 110-1 access to the network 150.

In step 830, after denying the given host computer 110-1 access to the network 150, the network device 115 supports further communications associated with the given host computer 110-1 to retrieve reconfiguration information (e.g., a new IP address) that enables the given host computer 110-1 to access the network 150 via a second network service NS #2. In other words, configuration server 160 sends host computer another network address for accessing network 150.

In more specific embodiments as previously discussed, network device 115 maintains a map 145 indicating on which of multiple network services (e.g., NS #1, NS #2, NS #3, . . . ) to forward network messages 102 from host computer 110-1 over the network 150 depending on a network address (initially network address B, thereafter network address E) identifying an origin of the network messages 102. Prior to receiving the command 194 to deny network access, configuration server 160 initially assigns the host computer 110-1 a first network address B and the network device 115 forwards network messages received from the given host computer over corresponding first network service NS #1.

A subscriber at host computer 110-1 may select a different network service (e.g. NS #2, NS #3, . . . ) in which to access network 150. The new network service may be a service provider that provides a different bandwidth or type of service network in general. In response to a new selection (such as NS #2) and updating of map 145, the configuration server 160 sends command 194 to network device 115 to deny host computer 110-1 access to network 150 via network address B. The command 194 may indicate to terminate link 120-1 such that the given host computer 110-1 no longer detects that it is coupled to or able to communicate over network device 115 to network 150. After receiving command 194 at the network device 115 and denying network access, the given host computer 110-1 initiates a routine of re-establishing a new link to access network 150. For example, host computer 110-1 sends a message to configuration server 160 for a new network address on which to access network 150. Configuration server 160 assigns the given host computer 110-1 a second network address (e.g., network address E). Based on the new network address E, the network device 115 forwards network messages 102 received from the given host computer 110-1 over a corresponding second network service NS #2.

Figure 9:
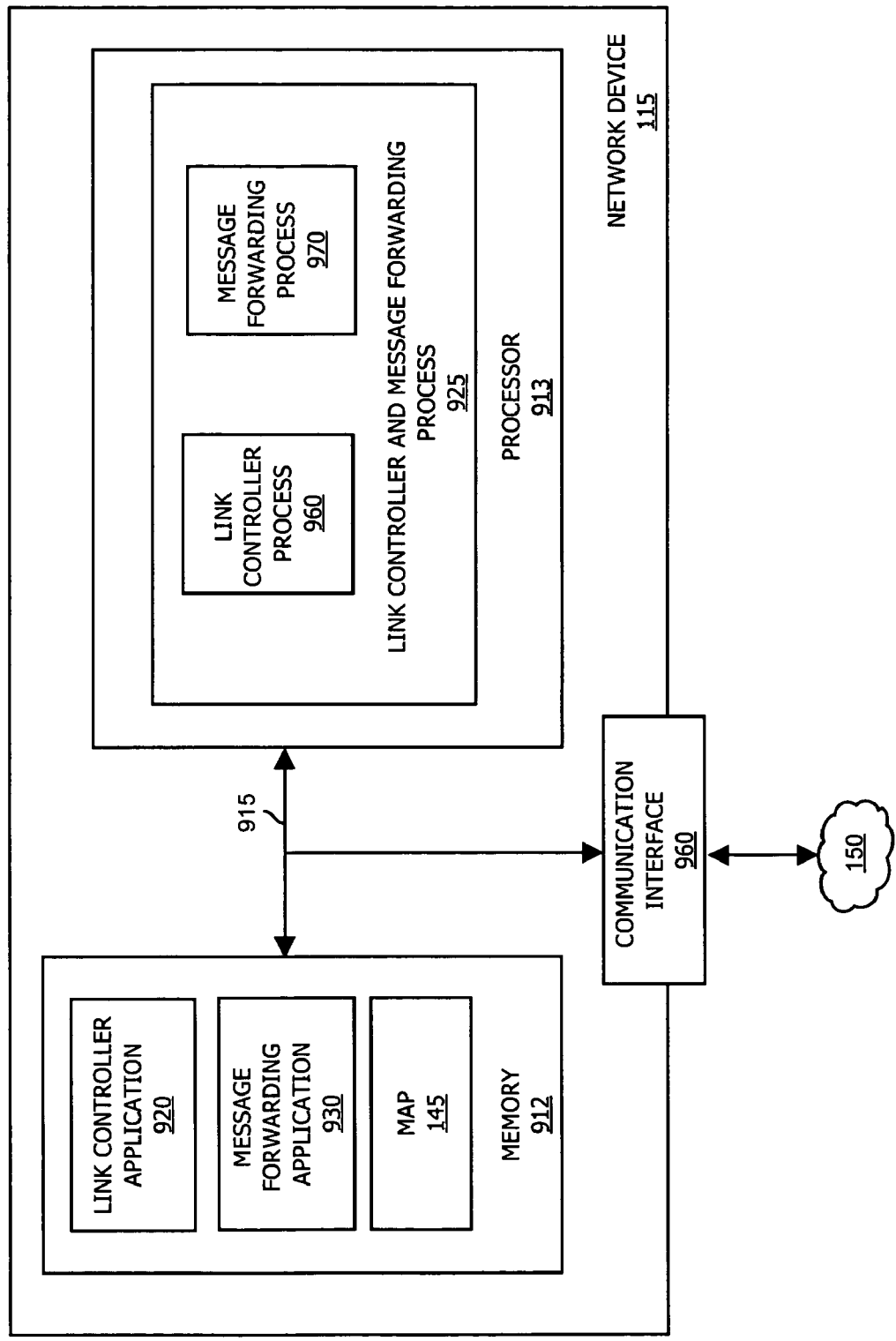
FIG. 9 is a block diagram of a suitable device for executing the flowchart in FIG. 8 according to an embodiment of the invention.

FIG. 9 is a block diagram of a hardware platform suitable for executing flowchart 800 in FIG. 8 (such as a computer program) according to an embodiment of the invention. According to one arrangement, network device 115 is a computerized device including interconnect 915 such as a data bus or other circuitry interconnecting memory 912, processor 913, and communication interface 960. Processor 913 may be any type of central processing unit, microprocessor, processing device, controller of other electronic circuitry capable of accessing link controller application 920 and message forwarding application 930 to execute, run, interpret, or otherwise operate link controller application 920 and message forwarding application 930 to process and forward messages and control links 120 according to embodiments of the invention as explained herein. In other words, link controller application 920 and message forwarding application 930 may be embodied as one or multiple software programs that enable network device 115 (and similar types of devices) to forward messages 102 and deny access to network 150 as discussed.

Memory 912 stores link controller application 920, as well as message forwarding application 930 and map 145 and address pool 164. In general, link controller application 920 and message forwarding application 930 in memory 912 represents software code, data and/or logic instructions executed by processor 913. When such code is executed, processor 913 creates link controller and message forwarding process 925, including link controller process 960 and message forwarding process 970.

In another arrangement, network device 115 implements flowchart 800 and related functions via a set of specially programmed integrated circuits (ICs) (e.g., Field-Programmable Gate Arrays, Application Specific ICs, etc.). In yet another arrangement, network device 115 includes a combination of programmable ICs and processor 913 to support the techniques of the present invention.

Embodiments of the invention may be employed such that a communication system 100 and portions thereof support a unique method of configuring host computers 110 to communicate over network 150. Use of the aforementioned techniques are particularly well-suited for use in network systems that supports disseminating configuration information to a given host computer 110-1 according to DHCP (Dynamic Host Control Protocol) and, more specifically, those that support disseminating network addresses (e.g., IP addresses) for use by host computers 110 that access a network 150 via one of multiple network services (e.g., NS #1, NS #2, NS #3, . . . ) as indicated by map 162 in configuration server 160.

In yet another embodiment, configuration server 160 transmits a reconfigure command (e.g., a DHCPFORCERENEW command) to force a host computer 110 to initiate being reassigned a new network address even though the host computer 110 does not formally support such a command as discussed above. In other words, the software version of an operating system run by a host computer 110 may not support the reconfigure command. In this embodiment, configuration server 160 generates a DHCPFORCERENEW message to, for example, host computer 110-1. Instead of the message being received at the target host computer 110-1 that does not formally support the command, network device 115 intercepts the DHCPFORCERENEW message and, in response, terminates a corresponding link 120-1 associated with the message to deny access to network 150. As discussed above, denial of network access by the intercepting node (e.g., network device 115) prompts host computer 110-1 to initiate use of the DHCP protocol to be reassigned a new network address.

Figure 10:
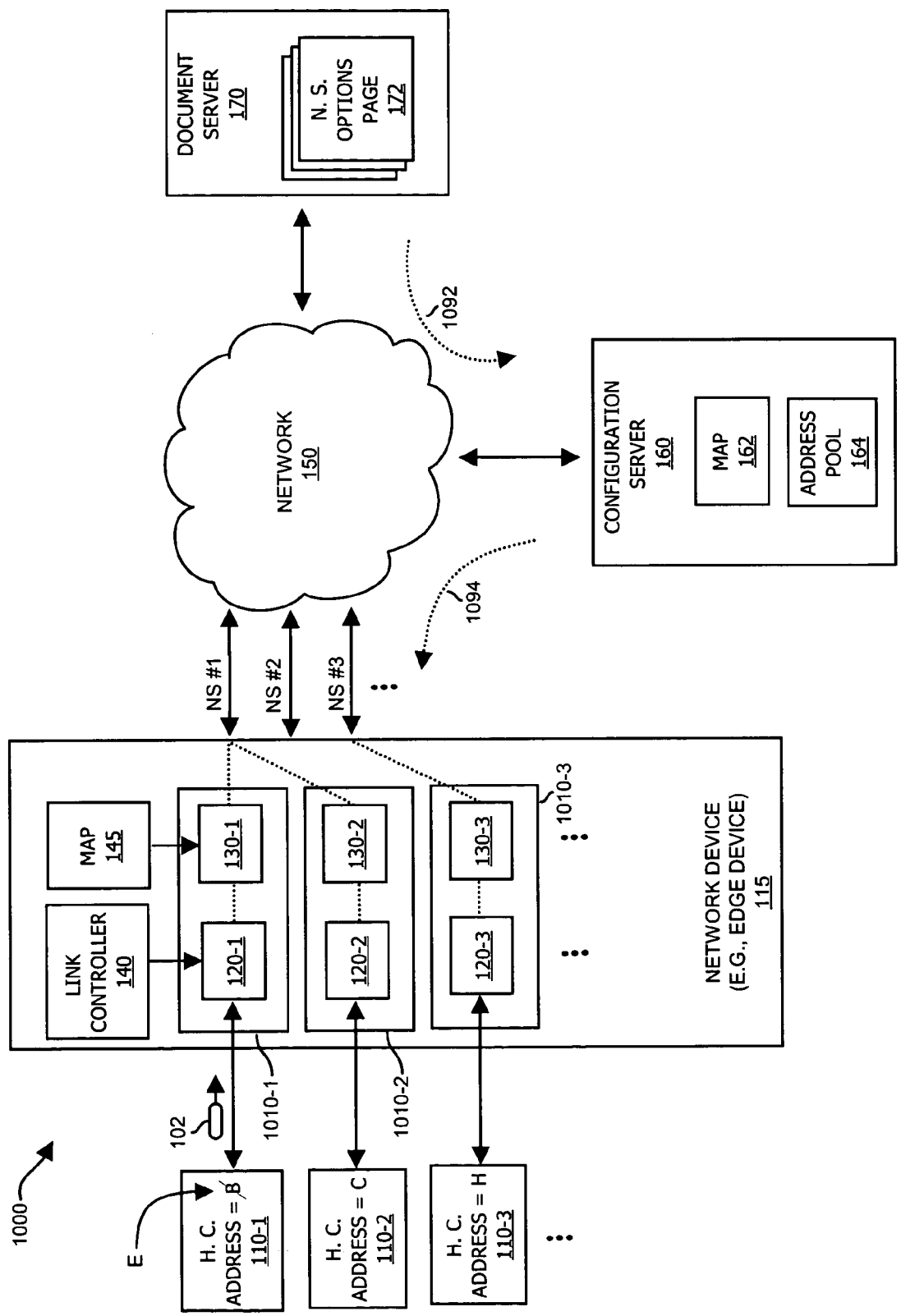
FIG. 10 is a block diagram of a communication system supporting reconfiguration techniques according to an embodiment of the invention.

More particularly, FIG. 10 is a diagram of a communication system 1000 according to an embodiment of the invention. As shown, communication system 1000 includes host computers 110-1, 110-2, 110-3, . . . (collectively, host computers 110), network device 115 (e.g., an edge device), network 150, document server 170, and configuration server 160. Network device 115 includes link controller 140, map 145, and network interfaces 1010-1, 1010-2, 1010-3 (collectively network interfaces 1010). Respective network interfaces 1010 include links 120-1, 120-2, 120-3, . . . , (collectively, links 120), and message forwarding modules 130-1, 130-2, 130-3, . . . , (collectively, message forwarding modules 130). Document server 170 generates and serves network service options page 172. Configuration server 160 includes map 162, and address pool 164.

Communication system 1000 operates similar to communication system 100 as shown in FIG. 1. However, in communication system 1000, configuration server 160 receives signal 1092 (e.g., a network message) from document server 170. The signal 1092 indicates that a user at a corresponding host computer 110-1 selects a new network service on which to communicate through network interface 1010-1 with network 150. In response to receiving signal 1092, configuration server 160 generates command 1094 (e.g., a DCHPFORCERENEW network message) to host computer 110-1.

In one specific embodiment of the invention, a host computer 110-1 is initially assigned (e.g., during power-up) an IP address B for accessing network 150 based on a corresponding first network service (e.g., a pre-established service provider or service plan). During the initialization IP assignment process, configuration server 160 assigns host computer 110-1 IP address B to access the network 150. For example, on startup, the host computer 110-1 communicates with a configuration server 160 to obtain an IP address from address pool 164. Using this initially assigned IP address B, the host computer 110-1 is able to access (e.g., via an edge device) web pages distributed by web servers over the network 150. A web page may include a list of available network service options (as in network service options page 172 of document server 170) that a subscriber or user of host computer 110-1 may select for supporting future access to the network 150.

The subscriber at host computer 110-1 selects a new service provider (supporting future network communications) by selecting a an entry in the network service options page 172. Upon selection of a new network service by the subscriber, the host computer 110-1 is eventually assigned a new IP address E that supports connectivity to the network via the newly selected network service plan. For example, via use of the network service options page 172, the subscriber at the host computer 110-1 selects a new network service on which to access the network 150 (such as the Internet) instead of a previously selected network service. In response to a subscriber's selection of a new network service, the document server 172 detects the subscriber's selection and generates a signal 1092 to configuration server 160. The signal 1092 to the configuration server 160 causes updating of a corresponding map 162 at the configuration server 160 tracking an identity of the host computer 110-1 and a corresponding network service that the host computer 110-1 is assigned to access the network 150.

To facilitate reassignment of a new network address such as network address E so that the host computer may access the network via the newly selected network service, the configuration server 160 sends a command 1094 (e.g., a DHCPFORCERENEW command) to the host computer 110-1 for reconfiguration purposes. Command 1094 includes a network address of host computer 110-1 to which the command is destined. Ideally, the host computer 110-1, upon receipt of the command 1094 through network interface 1010-1, would execute a reconfiguration routine based execution of the command 1094. As discussed, the host computer 110-1 may or may not support a reconfiguration command such as command 1094. Embodiments of the invention accommodate reconfiguration even if the host computer 110-1 does not support execution of the command 1094 (e.g., a reconfiguration command such as a DHCPFORCERENEW command).

In one embodiment, Network interface 1010-1 (e.g., part of a network edge device, a hub in a private LAN, etc.) intercepts command 1094 intended for receipt and execution by the host computer 110-1. In response to intercepting the command 1094 (potentially based on knowing that the host computer 110-1 does not support such a reconfiguration command), the network interface 1010-1 at least temporarily terminates a communication link 120-1 (e.g., to deny the subscriber and host computer 110-1 access to the network 150) through which the host computer 110-1 previously accessed the network 150 via an old network service. The host computer 110-1 detects termination of the link 120-1 (e.g., because it can no longer communicate through the network interface 1010-1 to the network 150) and automatically executes a routine (such as the INIT-REBOOT process typically employed at power-up) to request and retrieve a new IP address from address pool 164 at the configuration server 160. The new IP address (e.g., network address transmitted from configuration server 160 to host computer 110-1) enables the host computer 110-1 to access the network 150 via a newly selected service provider.

As mentioned, because the host computer 110-1 automatically performs the request for an IP address when the link 120-1 is terminated, the subscriber need not perform any manual operations to initiate reassignment of a new IP address E. Nor does the user of the host computer 110-1 need to be rebooted in order to be assigned a new network address. Instead, as discussed, the host computer 110-1 automatically initiates communication with the configuration server 160 in response to detecting a termination of link 120-1 (or disabling of the network interface 1010-1). Since the configuration server 160 includes a map 162 associating the host computer to the newly selected network service, the configuration server 160 sends the host computer an IP address E (e.g., from address pool 164) that enables host computer 110-1 access to the network 150 via the newly selected network service instead of the old network service. In other words, network address E supports network access via the newly selected network service. In this manner, a subscriber at the host computer 110-1 may be automatically reassigned a new IP address for accessing the network 150 whether or not the host computer 110-1 it supports a reconfiguration command such as the DHCPFORCERENEW command. Thus, embodiments of the invention alleviate the need to update the host computer 110-1 with a new version of software that supports receipt and execution of command 1094.

In another embodiment, the network interface 1010-1 is configured to pass command 1094 (originally intended for receipt and execution by the host computer 110-1) received from the configuration server 160 directly to the host computer 110-1 in lieu of intercepting the command 1094 as discussed. Thereafter, the network interface 1010-1 monitors communications from the host computer 110-1 (through the network interface 1010-1) to determine whether the host computer 110-1 executes the reconfiguration command and initiates a corresponding reconfiguration routine at the host computer 110-1. If the network interface 1010-1 does not detect communications from the host computer 110-1 indicating the initiation of a reconfiguration routine (e.g., in which host computer 110-1 communicates with configuration server 160 for assignment of a new network address E) by the host computer 110-1, the network interface 1010-1 at least temporarily disables further communications through the network interface 1010-1 to the network 150 from host computer 110-1 similar to techniques as discussed. Disabling the network interface 1010-1 (such as a communication link 120-1 to the network 150) prompts the host computer 110-1 to initiate a reconfiguration routine, such as the INIT-REBOOT process typically executed at computer to retrieve an IP address at power-up, for further communications through the network interface 1010-1 based on the newly selected network service. The INIT_REBOOT process may include generation of a DHCPREQUEST by a host computer 110 so that the host computer 110 can be assigned a network address to communicate over network 150.

According to one embodiment, network device 115 selectively forwards command 1094 (and similar commands to other host computers 110) depending on whether a corresponding host computer 110 supports a self-initiated reconfiguration routine based on receipt of a command. In one application, network device 115 learns whether a corresponding host computer 110 supports self-initiated reconfiguration based upon forwarding the command 1094 and monitoring further network messages as previously discussed. Based on learned attributes of the host computers 110, network device 115 selectively forwards future commands 1094 to host computers 110 depending on whether a host computer 110 supports a command. In one embodiment, network device 115 may be configured to support any of the modes discussed herein.

Figure 11:
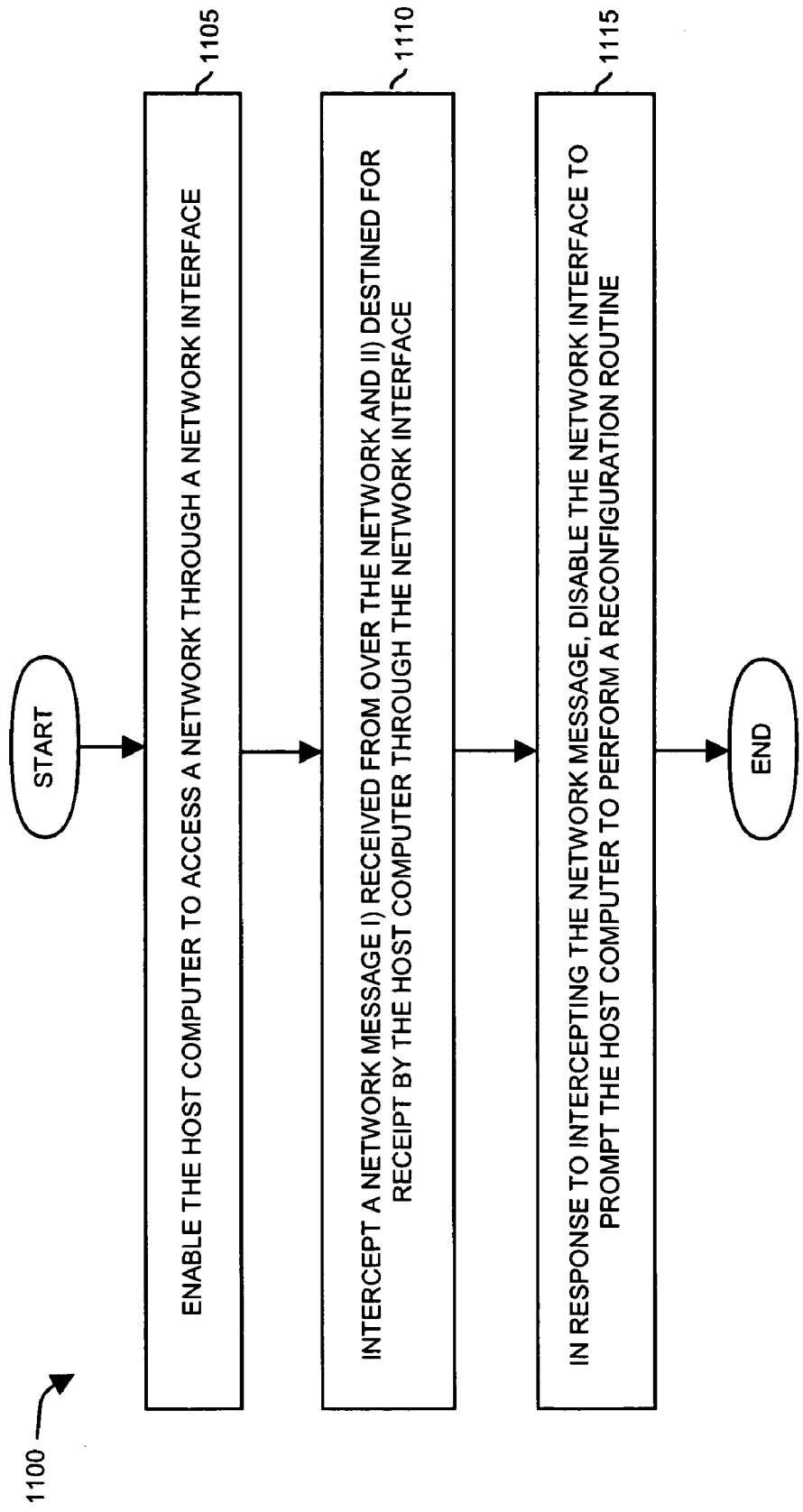
FIG. 11 is a flowchart illustrating a method of supporting reconfiguration according to an embodiment of the invention.

FIG. 11 is a flowchart 1100 illustrating a technique of initiating reconfiguration of a host computer 110 according to an embodiment of the invention. According to this embodiment, network interface 1010-1 intercepts network reconfigure commands transmitted to host computer 110-1.

In step 1105, network interface 1010-1 enables the host computer 110-1 to access network 150 via link 120-1.

In step 1110, network interface 1010-1 intercepts a command 1094 such as a network message i) received from over the network 150 and ii) destined for receipt by the host computer 110-1 through the network interface 150.

In step 1115, in response to intercepting the command 1094, the network interface 1094 disables communications on link 120-1 which prompts the host computer 110-1 to perform a reconfiguration routine. In one application, network interface 1010-1 terminates a link 120-1 between the host computer 110-1 and the network 150 at a link layer of a connection-oriented protocol supporting communications between the host computer 110-1 and the network 150 through the network interface 1010-1.

Figure 12:
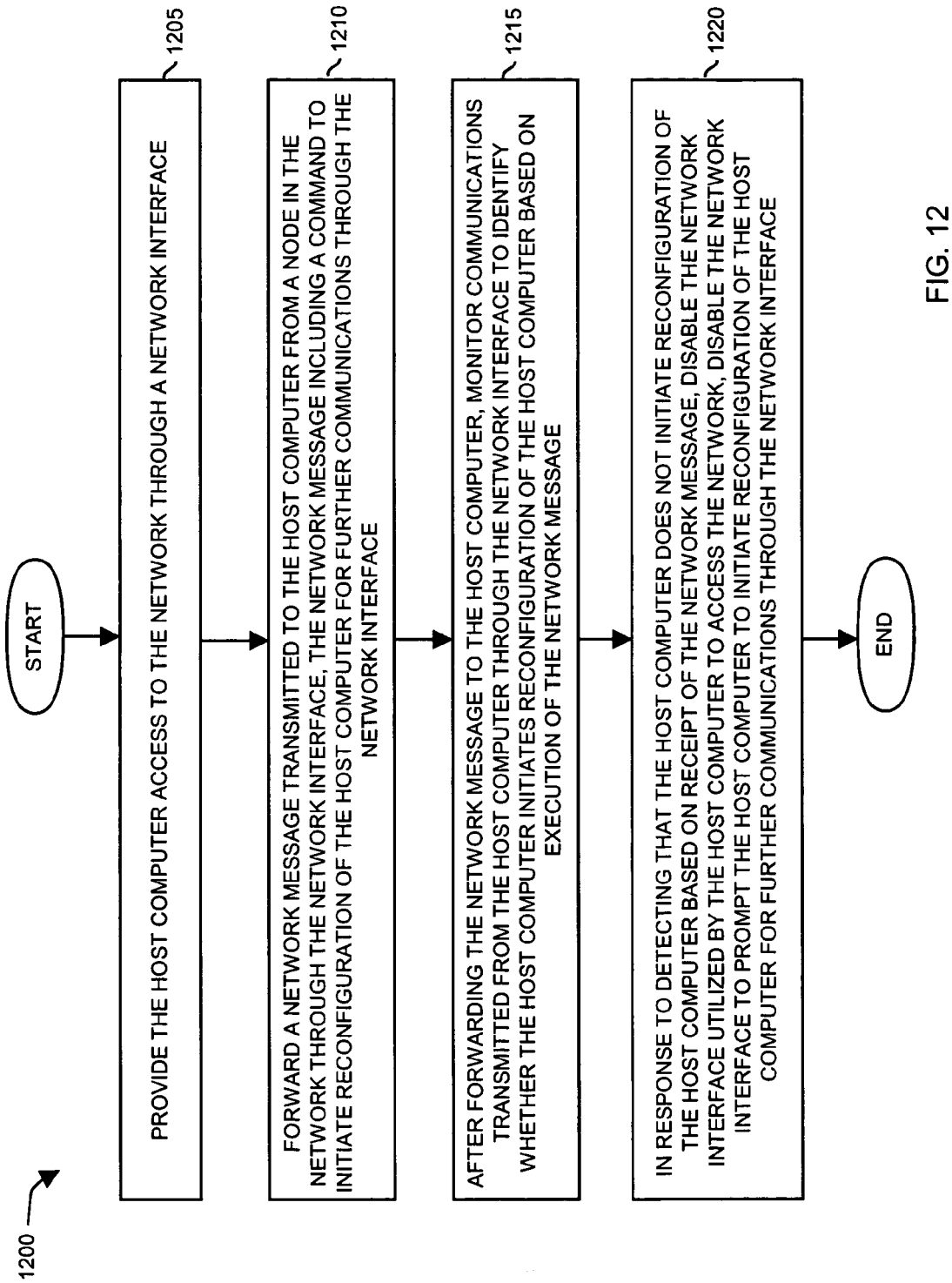
FIG. 12 is a flowchart illustrating a method of supporting reconfiguration according to an embodiment of the invention.

FIG. 12 is a flowchart 1200 illustrating a technique of initiating reconfiguration of a host computer 110 according to an embodiment of the invention. According to this embodiment, network interface 1010-1 passes network reconfigure commands transmitted to host computer 110-1. The network interface 1010-1 then monitors communications from the host computer 110-1 to network 150 to determine whether the host computer 110-1 initiates a reconfiguration routine based on receipt of the reconfigure command.

In step 1205, network interface 1010-1 provides the host computer 110-1 access to the network 150 through network interface 1010-1.

In step 1210, network interface 1010-1 forwards a command 1094 in a network message transmitted to the host computer 110-1 from a node in the network 150. The network message includes a command 1094 to initiate reconfiguration of the host computer 1094 for further communications through the network interface 1010-1.

In step 1215, after forwarding the command 1094 to the host computer 110-1, network interface 1010-1 monitors communications transmitted from the host computer 110-1 to identify whether the host computer 110-1 initiates reconfiguration of the host computer 110-1 based on execution of the command 1094 from configuration server 160.

In step 1220, in response to detecting that the host computer 110-1 does not initiate reconfiguration of the host computer 110-1 based on receipt of the command 1094, the network interface 1010-1 disables link 120-1 utilized by the host computer 110-1 to access the network 150. Disabling of the network interface 1010-1 prompts the host computer 110-1 to initiate reconfiguration of the host computer 110-1 for further communications through the network interface 1010-1.

The above embodiments (i.e., communication system 100 as shown in FIG. 1) describe how to control connectivity of host computers 110 to network 150 based on manipulating network connections (e.g., links 120) at network device 115 through which one or more corresponding host computers 110 connect to network 150. In certain circumstances, another device such as an intermediate device (e.g., a hub) may be disposed between the network device 115 and corresponding one or more host computers 110. In this instance, the technique of denying network access to a particular host computer 110-1 is different than the embodiments as discussed above. For example, the technique in this latter embodiment involves sending command 194 to network device 115 to terminate a corresponding link 120 so that the intermediate device is no longer in communication with network 150 through network device 115. When the intermediate device detects that its upstream interface (e.g., link 120-1 in network device 115) has been disabled, the intermediate device disables its downstream interfaces (e.g., a link to corresponding host computer 110-1) to deny the host computers 110-1 access to network 150. Similar in some respects to the techniques discussed above, denial of network access by the intermediate device in this way prompts the host computer 110-1 to initiate reassignment of a new network address. Thus, the intermediate device such as a hub may deny network access instead of the network edge device 1320, prompting a corresponding host computer 110 to request a new IP address.

Figure 13:
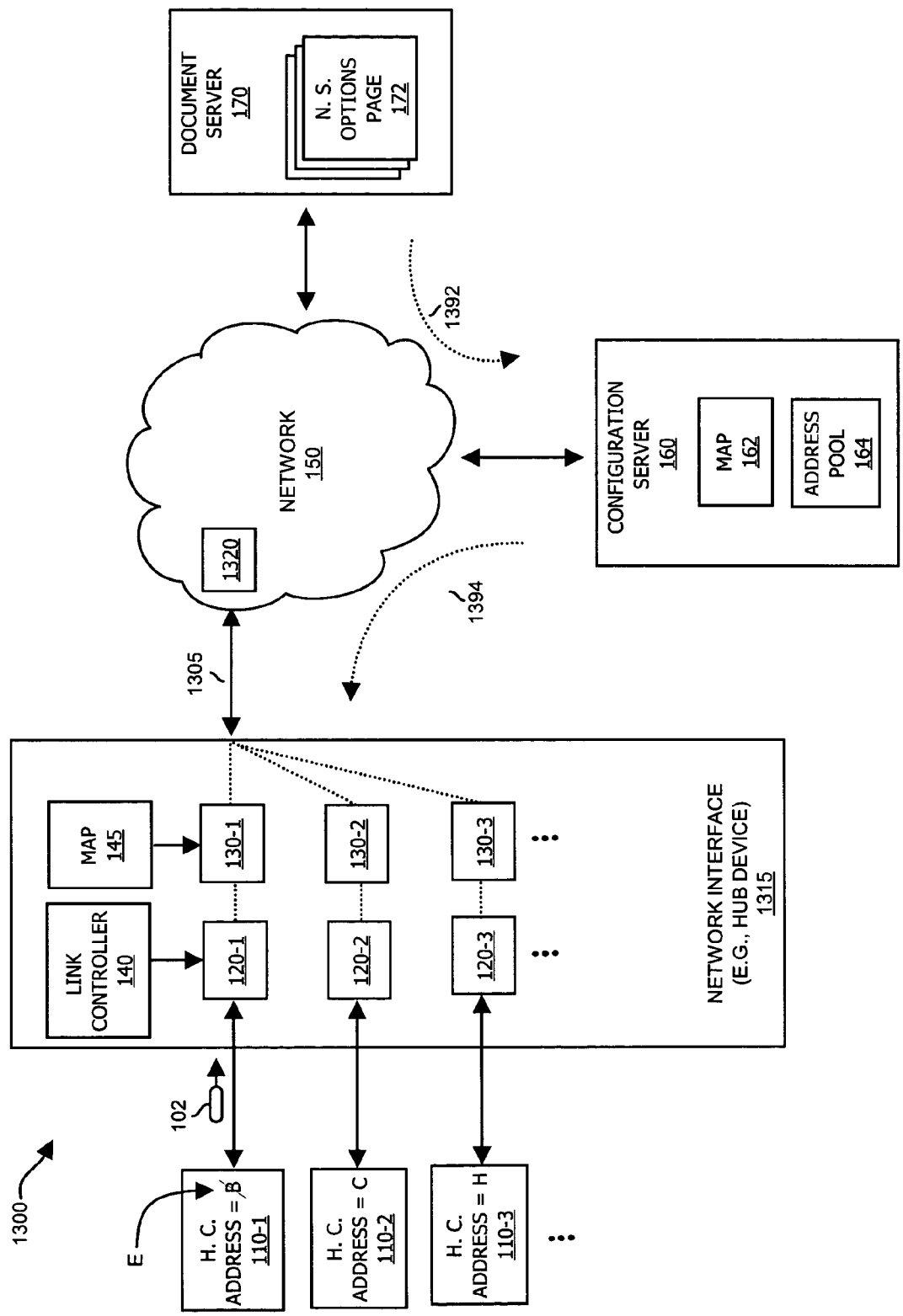
FIG. 13 is a block diagram of a communication system supporting reconfiguration techniques according to an embodiment of the invention.

FIG. 13 is a diagram illustrating communication system 1300 according to a further embodiment of the invention. As shown, communication system 1300 includes host computers 110-1, 110-2, 110-3, . . . (collectively, host computers 110), network interface 1315 (e.g., a hub device), link 1305 (e.g., a DSL line, cable modem line, etc.) network 150, edge device 1320, document server 170, and configuration server 160. Network interface 1315 includes link controller 140, links 120-1, 120-2, 120-3, . . . , (collectively, links 120), map 145, and message forwarding modules 130-1, 130-2, 130-3, . . . , (collectively, message forwarding modules 130). Document server 170 generates and serves network service options page 172. Configuration server 160 includes map 162, and address pool 164.

Communication system 1300 operates similar to the previously discussed embodiments. However, as shown, network interface 1315 can be a hub device in a home computer application. Link 1305 supports communication between network interface 1315 and edge device 1320 of network 150 enabling host computer 110 to access network 150 through network interface 1315 and edge server 1320.

During one mode of operation, configuration server 160 receives a signal 1392 to modify configuration information (e.g., map 162) associated with a given host computer 110 similar to embodiments as previously discussed. To prompt reconfiguration of the given host computer 110, the configuration server 160 generates a reconfiguration command 1394 to the given host computer. Network interface 1315 (through which the given host computer 110 accesses a network 150)

intercepts the reconfigure command 1094 and terminates a communication link 120-1 through which the given host computer 110 communicates to access the network 150. Termination of the communication link 110 prompts the given host computer to initiate a reconfiguration routine for assignment of a new network address from configuration server 160. Alternatively, the network interface 1315 forwards the reconfigure command 1394 to a host computer 110 and monitors communications from the host computer to determine whether it executes the reconfigure command 1394. If the network interface does not detect communications from the host computer to the configuration server 160 for updating an IP address, the network interface 1315 terminates a communication link 120 prompting the host computer 110-1 to initiate a reconfiguration routine for assignment of a new network address. The reconfiguration routine includes generating and transmitting network messages from the host computer 110-1 to the configuration server 160 as well as receiving network messages from the configuration server 160 from the host computer 110. In one application, the communications are based on DHCP in which a host computer 110 requests a network address to communicate over network 150.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for reconfiguring a host computer to access a network, the method comprising:
   providing the host computer access to the network through a network interface;
   forwarding a network message transmitted to the host computer from a node in the network through the network interface, the network message including a command to initiate reconfiguration of the host computer for further communications through the network interface;
   after forwarding the network message to the host computer, monitoring communications transmitted from the host computer through the network interface to identify whether the host computer initiates reconfiguration of the host computer based on execution of the network message; and
   in response to detecting that the host computer does not initiate reconfiguration of the host computer based on receipt of the network message, disabling the network interface utilized by the host computer to access the network.

2. A method as in claim 1 wherein disabling the network interface includes temporarily disabling a link supporting communications from the host computer through the network interface to deny the host computer access to the network, denial of access to the network prompting the host computer to initiate reconfiguration of the host computer for further communications through the network interface.

3. A method as in claim 1, wherein disabling the network interface utilized by the host computer includes:
   temporarily terminating an electronic signal otherwise transmitted on a communication link from the network interface to the host computer to maintain a connection between the host computer and the network, termination of the electronic signal causing the host computer to initiate a routine to re-establish another communication link through the network interface to access the network.

4. A method as in claim 1, wherein disabling the network interface causes the host computer to detect that the host computer is no longer able to communicate through the network interface, the host computer, in response, initiating a routine to re-establish a link through the network interface to access the network via a different network service than used to access the network prior to the disabling of the network interface.

5. A method as in claim 1 further comprising:
   receiving a second network message through the network interface from over the network;
   identifying that the second network message includes a reconfiguration command directed to a second host computer; and
   forwarding the second network message to the second host computer which executes the reconfiguration command to reconfigure the second host computer with a new network address.

6. A method as in claim 1, wherein providing the host computer access to the network through the network interface includes:
   supporting communications between the host computer and the network through the network interface based on a connection oriented protocol.

7. A method as in claim 6, wherein disabling the network interface includes:
   terminating a link between the host computer and the network at a link layer of a connection-oriented protocol supporting communications between the host computer and the network through the network interface.

8. A method as in claim 6, wherein disabling the network interface prompts the host computer to initiate a request for an assignment of a new network address supporting further communications through the network interface.

9. A method as in claim 1 further comprising:
   identifying that the network message is a reconfigure command transmitted from a configuration server through the network interface to the host computer, the network message transmitted by the configuration server to initiate reconfiguration of the host computer.

10. A method as in claim 9, wherein identifying that the network message is a reconfigure command includes:
    detecting that the network message is a DHCPFORCERENEW (Dynamic Host Control Protocol Force Renew) message transmitted from the configuration server to the host computer, the configuration server attempting to initiate reconfiguration of a network address of the host computer via the network message.

11. A method as in claim 1 wherein:
    the method further comprises receiving at the network interface from the host computer a web-based command to connect the host computer to the network via a different network service than used to connect the host computer to the network prior to the disabling of the network interface, and sending the web-based command across the network to the node in the network; and
    forwarding the network message includes receiving, at the network interface, the network message from the node in the network in response to sending the web-based command across the network to the node in the network.

12. A method as in claim 1, wherein the network is separate from the host computer and network interface, and is accessible by the network interface via any one of a plurality of network services;
    wherein providing the host computer access to the network through the network interface includes assigning the host computer a first IP address to allow the host computer to access the network via use of a first network service;
wherein the command to initiate reconfiguration of the host computer includes a command to obtain a second IP address that is different from the first IP address to allow the host computer to access the network via use of a second network service; and
further comprising assigning the host computer the second IP address to allow the host computer to access the network via use of the second network service.

13. A computer system supporting access to a network, the computer system including:
a processor;
a memory unit that stores instructions associated with an application executed by the processor;
a communication interface that supports communication with nodes in the network; and
an interconnect coupling the processor, the memory unit, and the communication interface, enabling the computer system to execute the application and perform operations of:
providing a host computer access to the network through a network interface;
forwarding a network message transmitted to the host computer from a node in the network through the network interface, the network message including a command to initiate reconfiguration of the host computer for further communications through the network interface;
after forwarding the network message to the host computer, monitoring communications transmitted from the host computer through the network interface to identify whether the host computer initiates reconfiguration of the host computer based on execution of the network message; and
in response to detecting that the host computer does not initiate reconfiguration of the host computer based on receipt of the network message, disabling the network interface utilized by the host computer to access the network.

14. A computer system as in claim 13 wherein the operation of disabling the network interface includes temporarily disabling a link supporting communications from the host computer through the network interface to deny the host computer access to the network, denial of access to the network prompting the host computer to initiate reconfiguration of the host computer for further communications through the network interface.

15. A computer system as in claim 13, wherein the operation of disabling the host computer includes:
temporarily terminating an electronic signal otherwise transmitted on a communication link from the network interface to the host computer to maintain a connection between the host computer and the network, termination of the electronic signal causing the host computer to initiate a routine to re-establish another communication link through the network interface to access the network.

16. A computer system as in claim 13, wherein the operation of disabling the network interface causes the host computer to detect that the host computer is no longer able to communicate through the network interface, the host computer, in response, initiating a routine to re-establish a link through the network interface to access the network via a different network service than used to access the network prior to the disabling of the network interface.

17. A computer system as in claim 13 further performing operations of:
receiving a second network message through the network interface from over the network;
identifying that the second network message includes a reconfiguration command directed to second host computer; and
forwarding the second network message to the second host computer which executes the reconfiguration command to reconfigure the second host computer with a new network address.

18. A computer system as in claim 13, wherein providing the host computer access to the network through a network interface includes:
supporting communications between the host computer and the network through the network interface based on a connection oriented protocol.

19. A computer system as in claim 18, wherein the operation of disabling the network interface includes:
terminating a link between the host computer and the network at a link layer of a connection-oriented protocol supporting communications between the host computer and the network through the network interface.

20. A computer system as in claim 18, wherein the operation of disabling the network interface prompts the host computer to initiate a request for an assignment of a new network address supporting further communications through the network interface.

21. A computer system as in claim 13 further performing operations of:
identifying that the network message is a reconfigure command transmitted from a configuration server through the network interface to the host computer, the network message transmitted by the configuration server to initiate reconfiguration of the host computer.

22. A computer system as in claim 21, wherein the operation of identifying that the network message is a reconfigure command includes:
detecting that the network message is a DHCPFORCERENEW (Dynamic Host Control Force Renew) message transmitted from the configuration server to the host computer, the configuration server attempting to initiate reconfiguration of a network address of the host computer via the network message.

23. A computer system as in claim 13 further performing operations of receiving at the network interface from the host computer a web-based command to connect the host computer to the network via a different network service than used to connect the host computer to the network prior to the disabling of the network interface, and sending the web-based command across the network to the node in the network; and
wherein:
the operation of forwarding the network message includes receiving, at the network interface, the network message from the node in the network in response to sending the web-based command across the network to the node in the network.

24. A computer system as in claim 13, wherein the network is separate from the host computer and network interface, and is accessible by the network interface via any one of a plurality of network services;
wherein providing the host computer access to the network through the network interface includes assigning the host computer a first IP address to allow the host computer to access the network via use of a first network service;

wherein the command to initiate reconfiguration of the host computer includes a command to obtain a second IP address that is different from the first IP address to allow the host computer to access the network via use of a second network service; and wherein the interconnect coupling further enables the computer system to execute the application and perform operations of assigning the host computer the second IP address to allow the host computer to access the network via use of a second network service.

25. A computer system coupled to a network that supports transmission of data, the computer system including:

means for providing a host computer access to the network through a network interface;

means for forwarding a network message transmitted to the host computer from a node in the network through the network interface, the network message including a command to initiate reconfiguration of the host computer for further communications through the network interface after forwarding the network message to the host computer, means for monitoring communications transmitted from the host computer through the network interface to identify whether the host computer initiates reconfiguration of the host computer based on execution of the network message; and in response to detecting that the host computer does not initiate reconfiguration of the host computer based on receipt of the network message, means for disabling the network interface utilized by the host computer to access the network.

26. A computer program product including a computer-readable medium having instructions stored thereon for processing data information, such that the instructions, when carried out by a processing device, enable the processing device to perform the steps of:

providing a host computer access to a network through a network interface;

forwarding a network message transmitted to the host computer from a node in the network through the network interface, the network message including a command to initiate reconfiguration of the host computer for further communications through the network interface;

after forwarding the network message to the host computer, monitoring communications transmitted from the host computer through the network interface to identify whether the host computer initiates reconfiguration of the host computer based on execution of the network message; and in response to detecting that the host computer does not initiate reconfiguration of the host computer based on receipt of the network message, disabling the network interface utilized by the host computer to access the network.

* * * * *